May 21, 1957 W. W. KILGARD ET AL 2,792,677
WRAPPING MACHINE
Filed Dec. 18, 1953 12 Sheets-Sheet 3

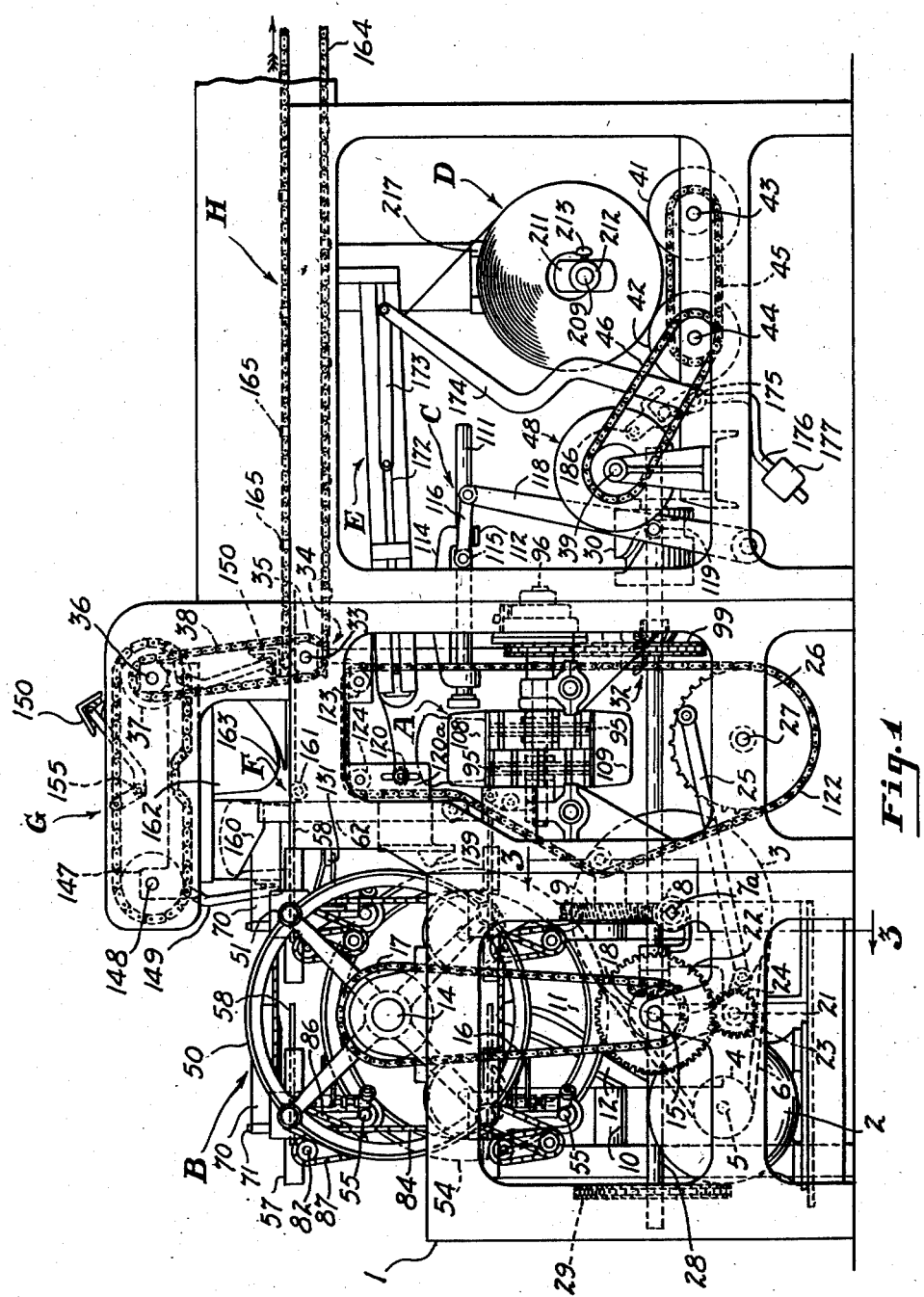

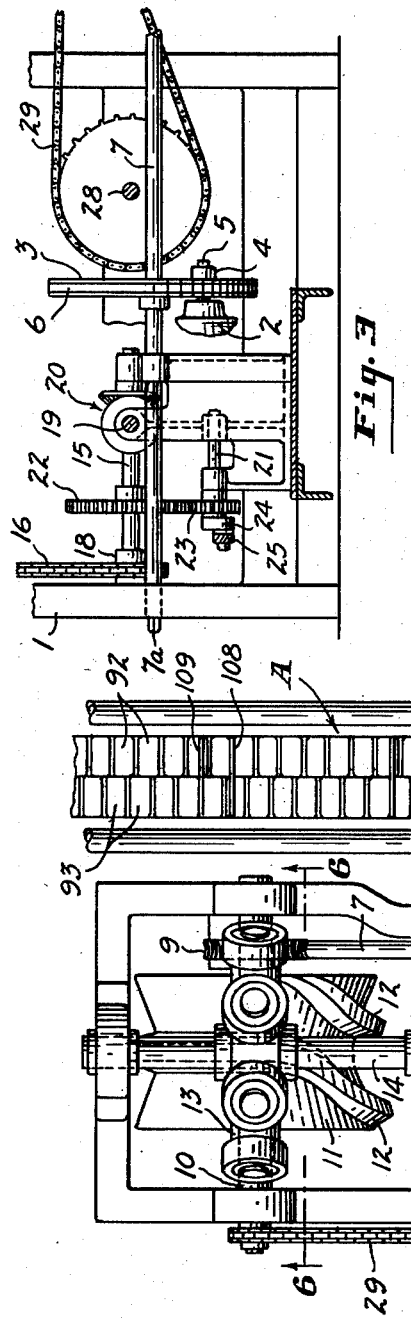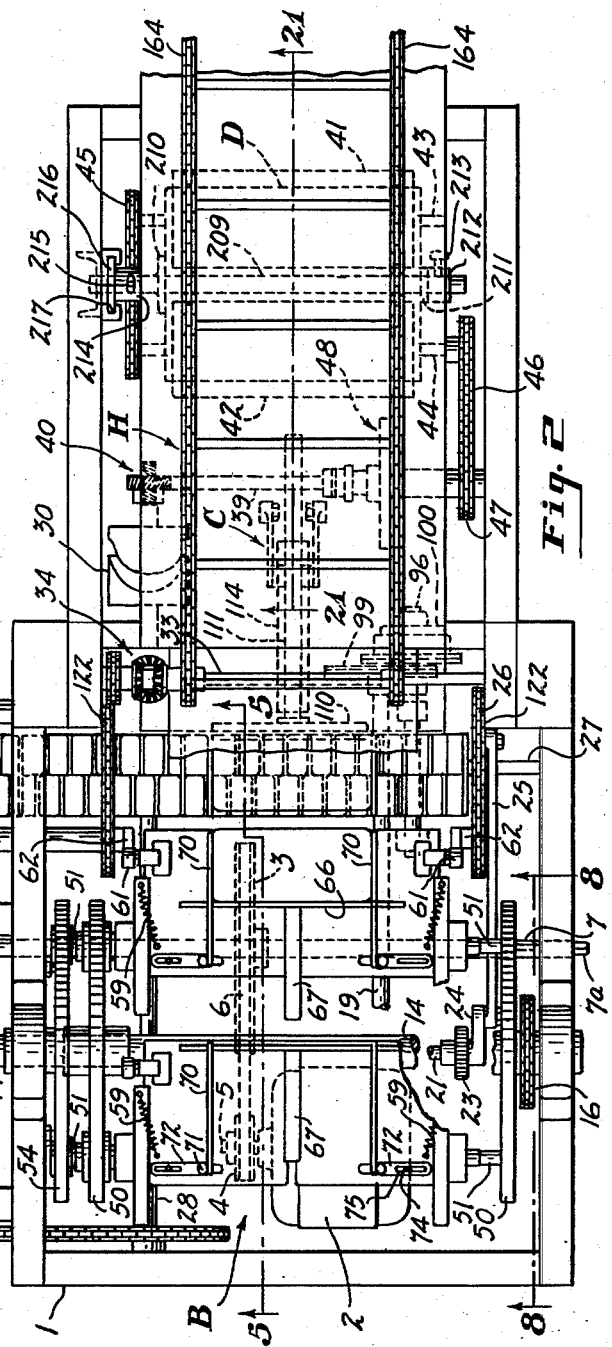

INVENTORS
WALTER W. KILGARD
GORDON HILL
BY Evans + McCoy
ATTORNEYS

May 21, 1957 W. W. KILGARD ET AL 2,792,677
WRAPPING MACHINE
Filed Dec. 18, 1953 12 Sheets-Sheet 4
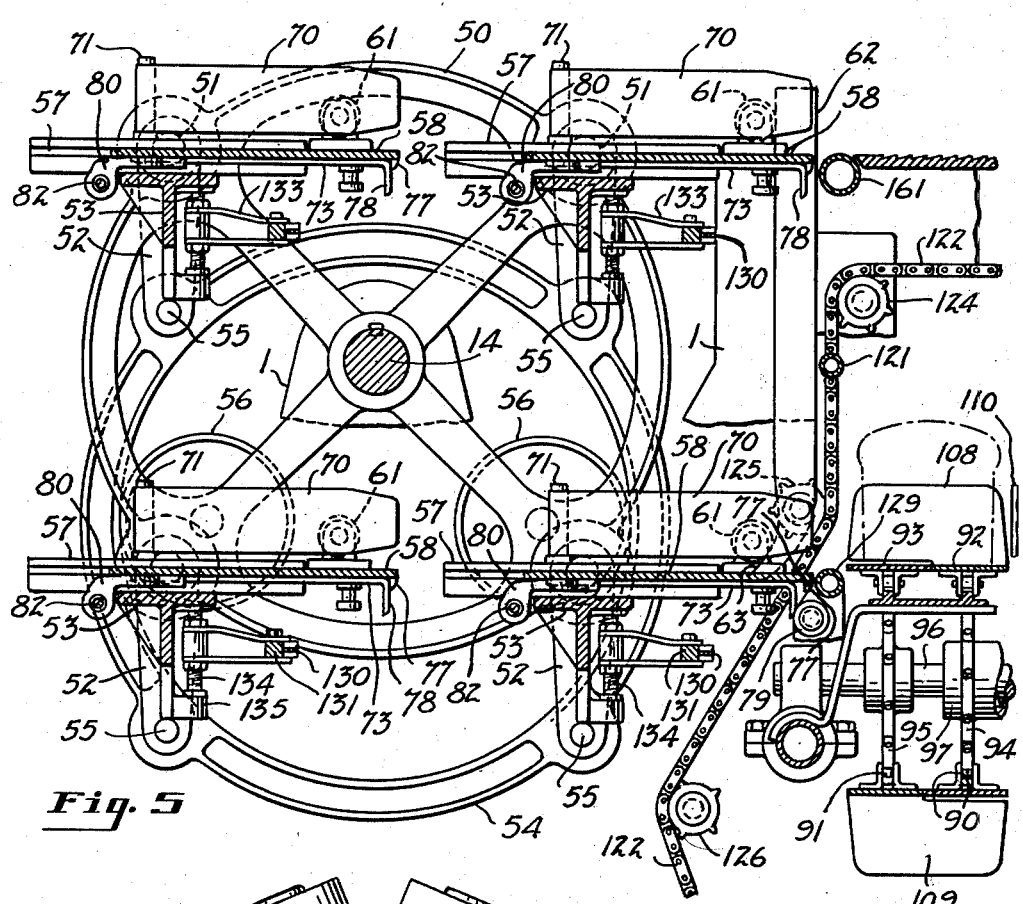
Fig. 5
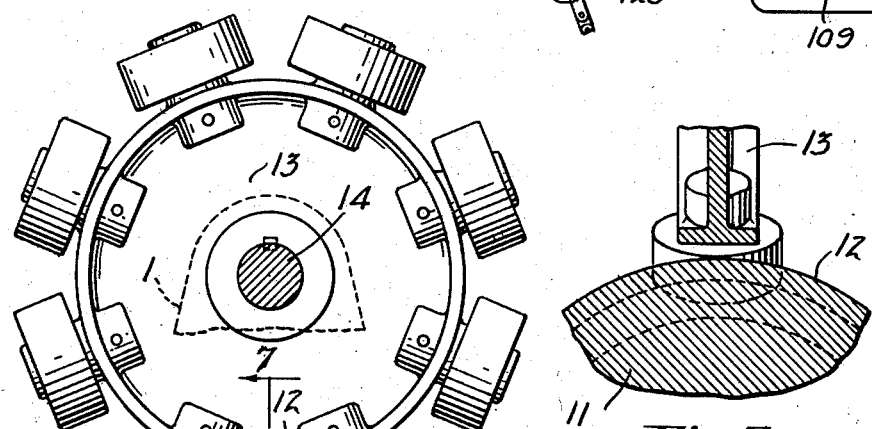
Fig. 6
Fig. 7
INVENTORS
WALTER W. KILGARD
GORDON HILL
BY 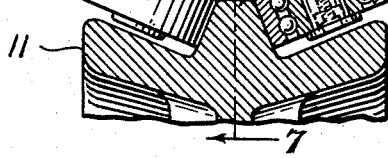
ATTORNEYS INVENTORS
WALTER W. KILGARD
GORDON HILL
BY Evans & McCoy
ATTORNEYS

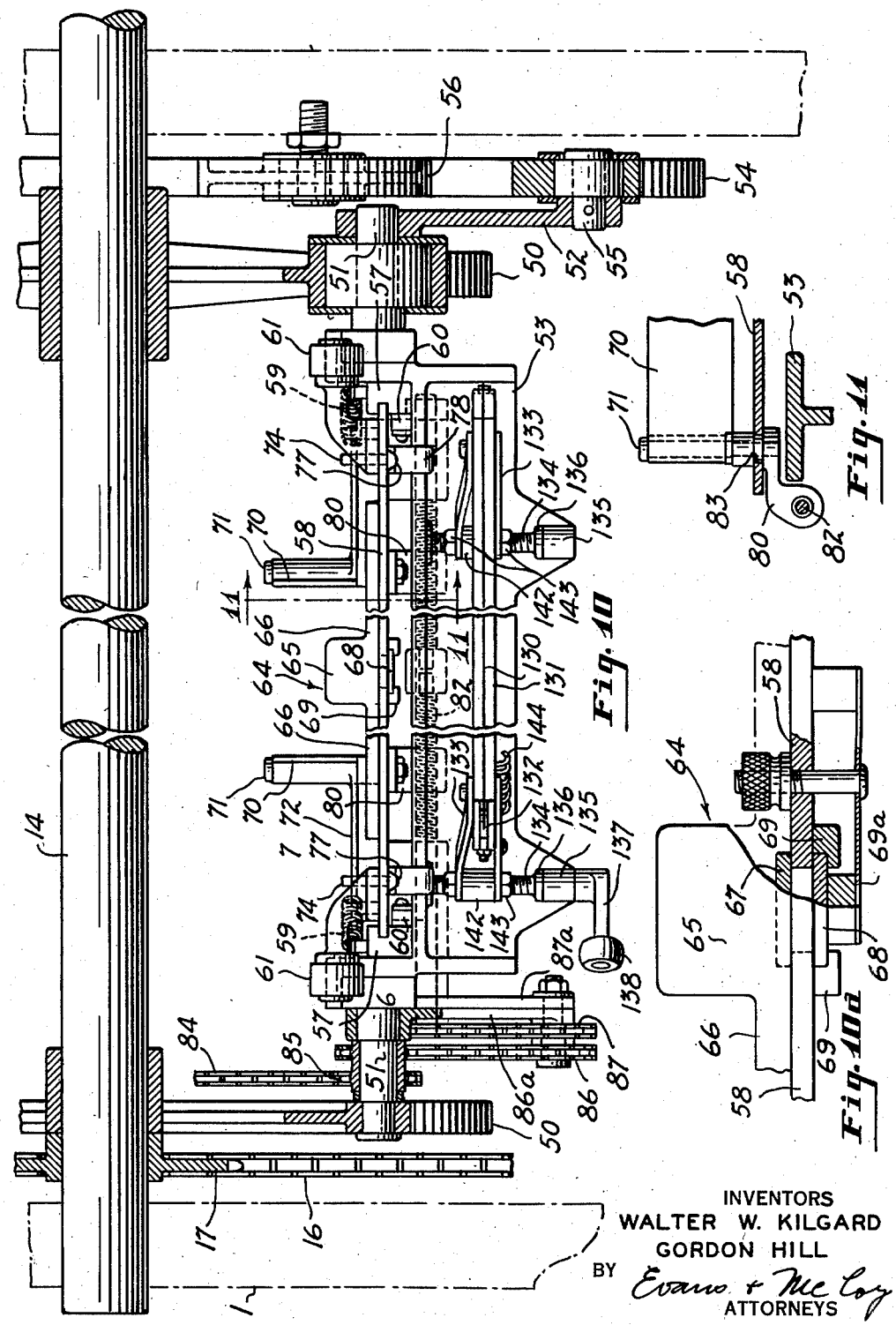

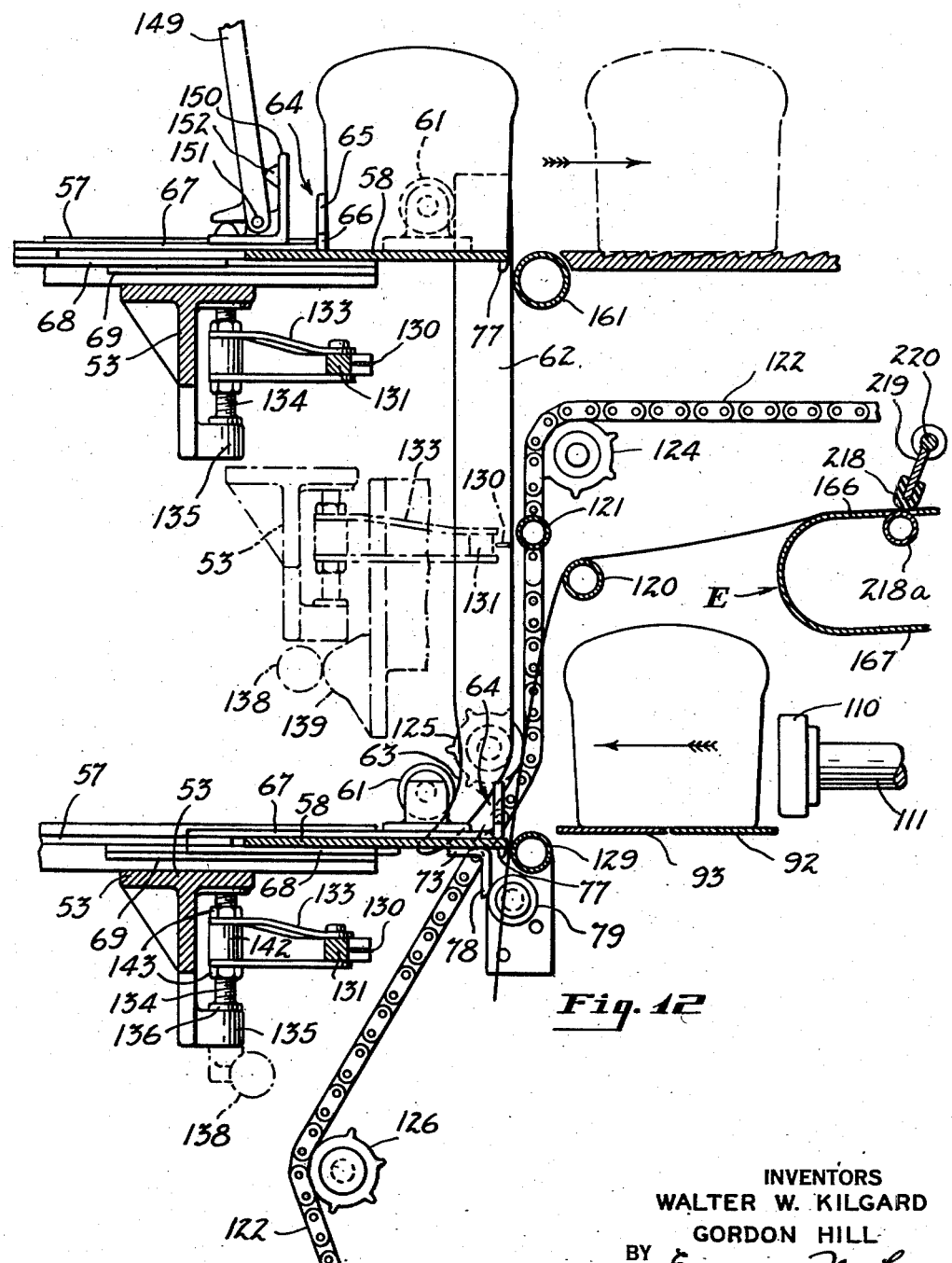

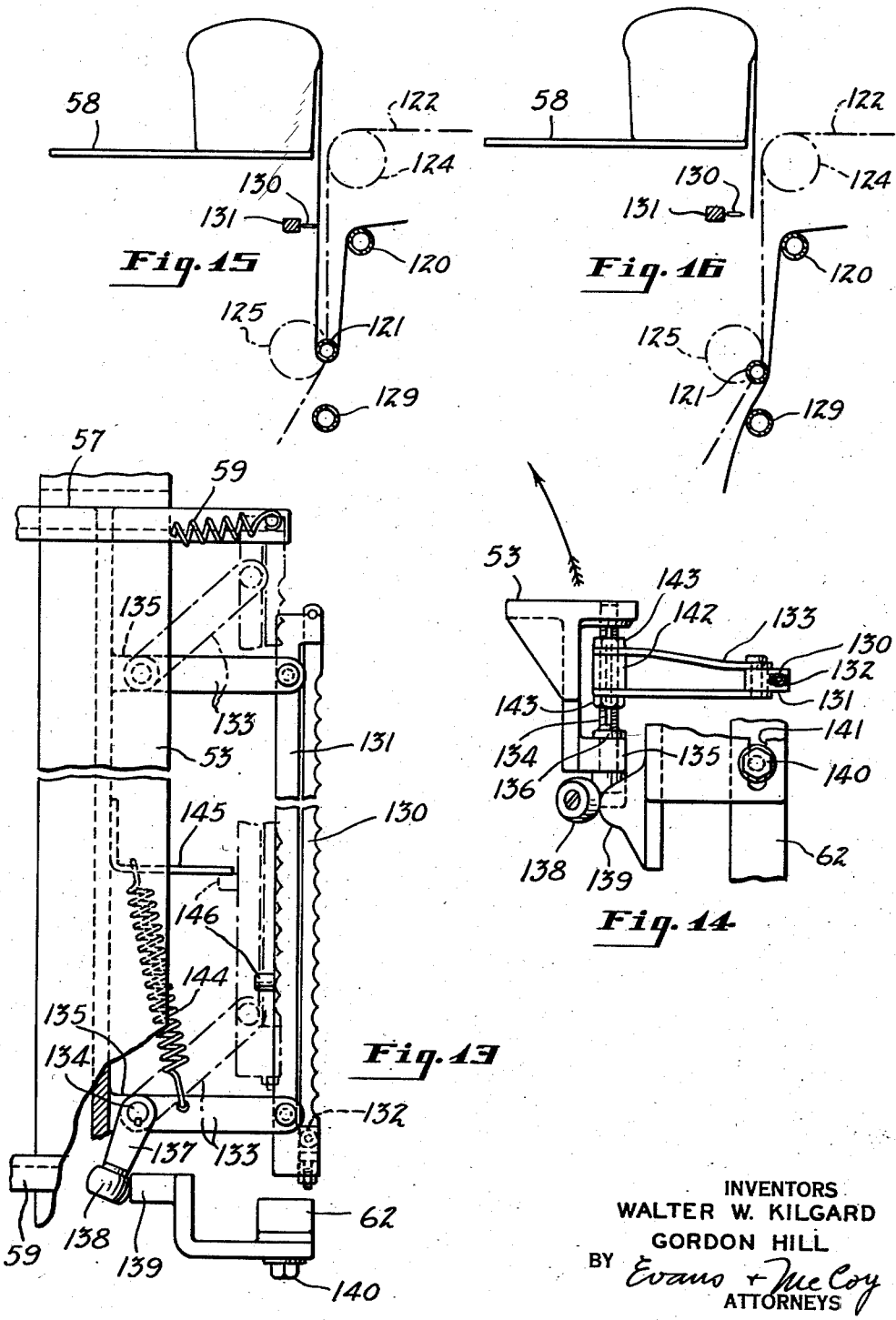

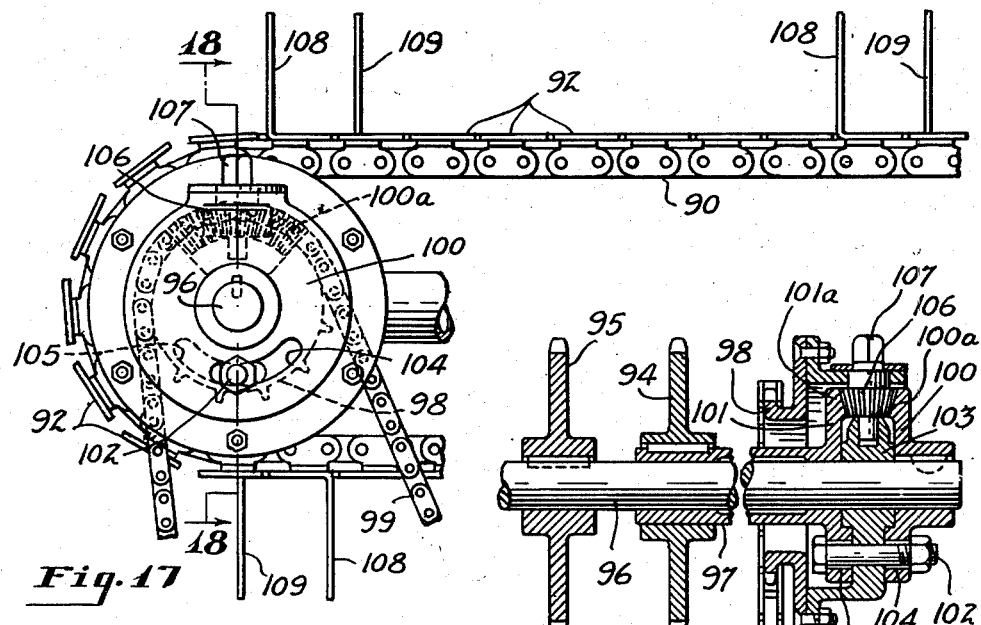
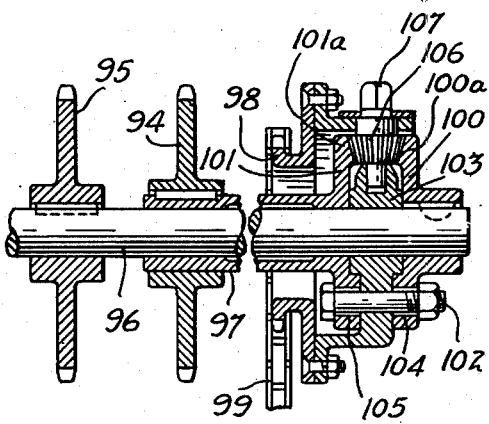
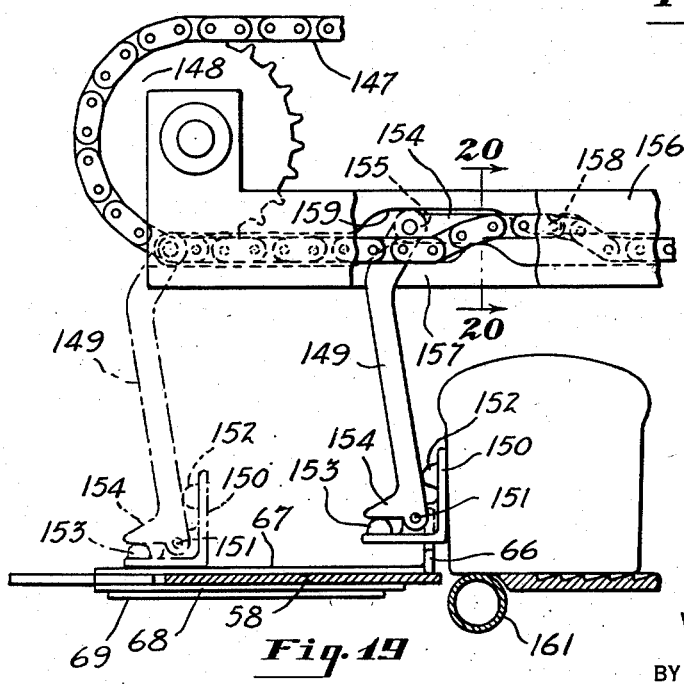
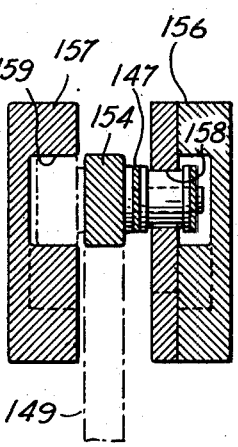

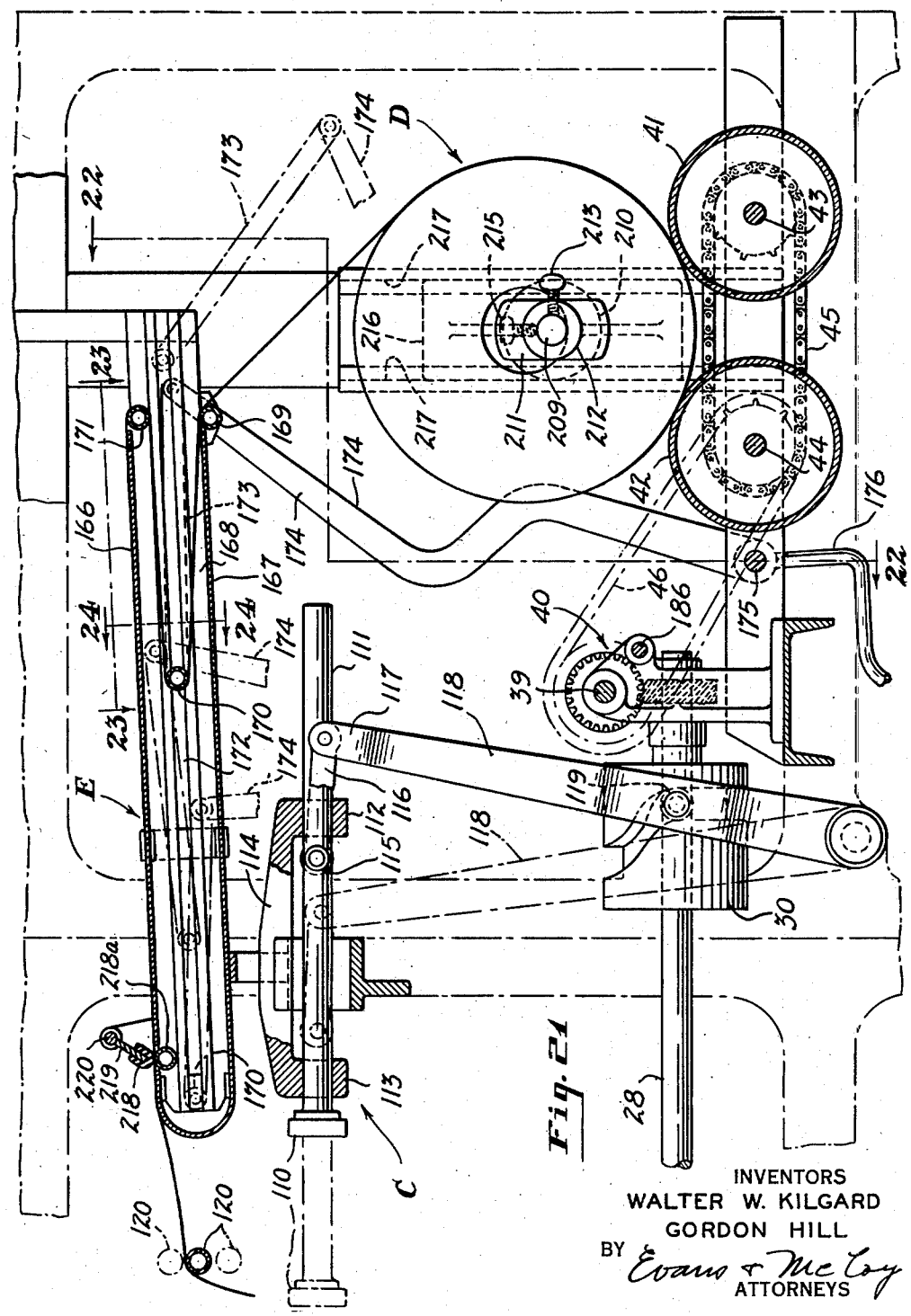

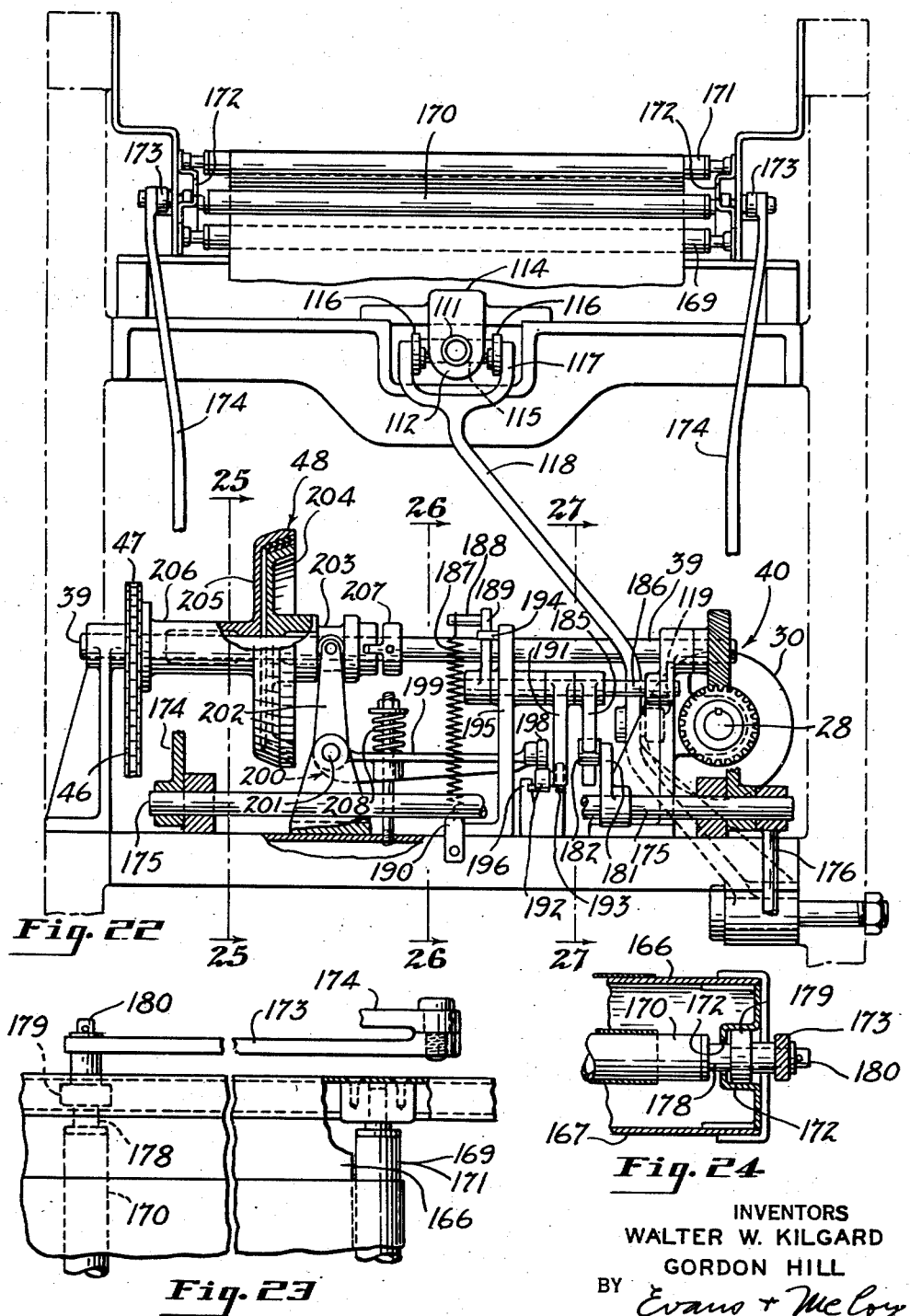

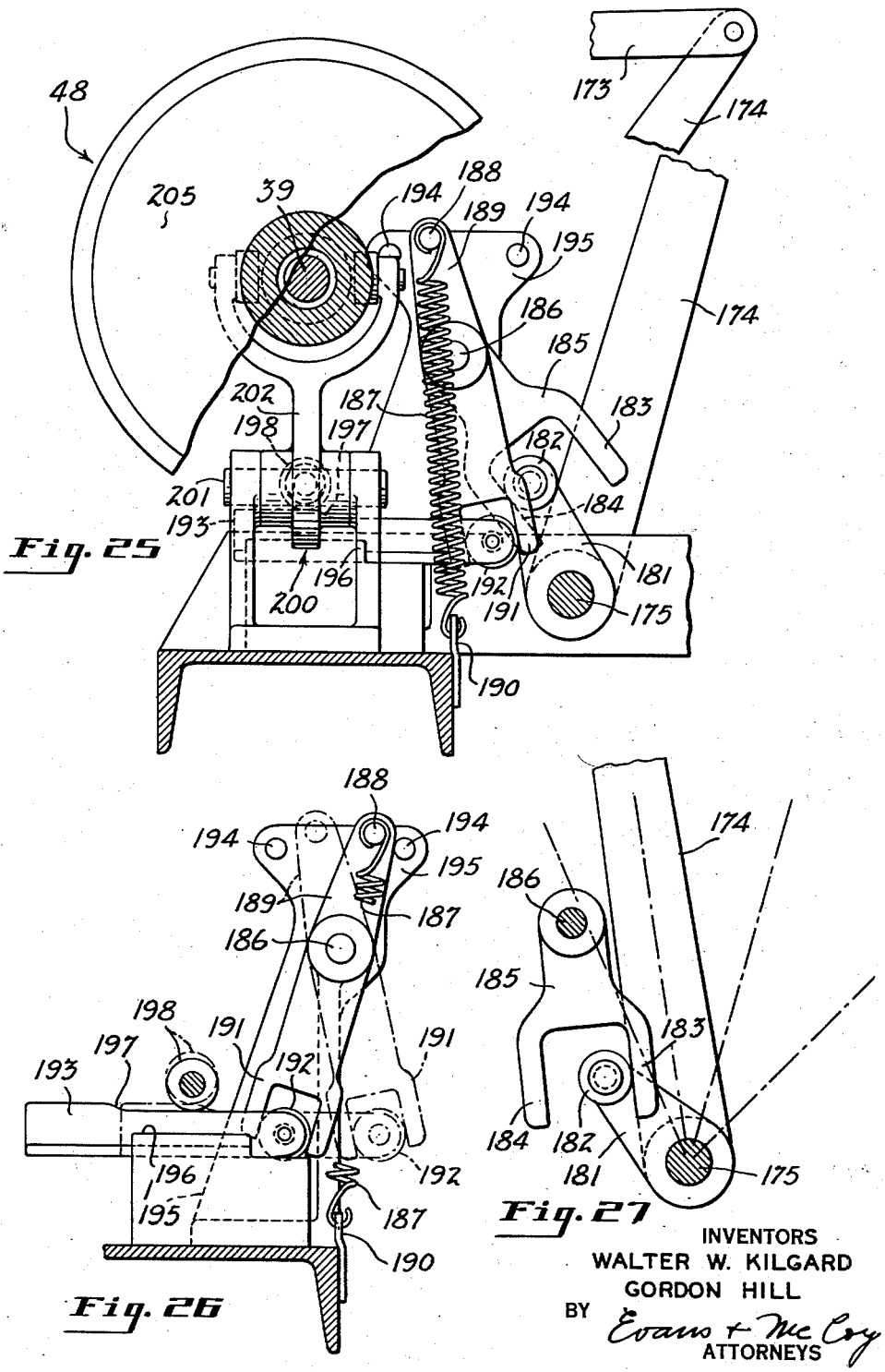

United States Patent Office 2,792,677
Patented May 21, 1957

2,792,677
WRAPPING MACHINE

Walter W. Kilgard and Gordon Hill, Bettendorf, Iowa, assignors, by mesne assignments, to American Machine & Foundry Company, New York, N. Y., a corporation of New Jersey Application December 18, 1953, Serial No. 398,950

41 Claims. (Cl. 53—66)

This invention relates to wrapping machines and particularly to wrapping machines of the type employed for wrapping sliced loaves of bread as they are delivered from a slicing machine.

The machine of the present invention is of the type in which a continuous web of a suitable wrapping material such as paper is fed to the wrapping mechanism and in which each article to be wrapped measures the paper required to wrap it. In machines of the character referred to each article is transferred by an elevator from a receiving station to a discharging station during the wrapping operation, each article to be wrapped being engaged with the leading end of the wrapper web that is draped in the path of the article as it is moved onto the elevator. After it is placed on the elevator the article is lifted from the receiving station to a discharging station, causing the leading end of the wrapper web to be wound about the article and the article is discharged from the elevator into a folding and sealing channel where the wrapping operation is completed.

Heretofore wrapping machines of the type referred to have employed an elevator that is reciprocated during each wrapping cycle with a dwell at the receiving station and a dwell at the discharge station.

In the machine of the present invention a high wrapping speed is obtained by employing an elevator which has a series of regularly spaced platens which trail one another in an endless path and which are spaced apart a distance corresponding to the distance between the receiving station and the discharging station. The elevator is intermittently driven in one direction with a dwell after each actuation and is moved during each actuation a distance corresponding to the spacing of the platens, the elevator being stopped after each actuation with two successive platens positioned at the receiving and discharging stations so that an article to be wrapped may be delivered to an elevator platen at the receiving station while another article is being discharged therefrom at the discharging station. By employing an elevator which moves intermittently in one direction only, the feeding of an article to the elevator can be performed simultaneously with the discharge of another article from the elevator so that there need be only one elevator dwell period in the wrapping cycle, thereby making it possible to greatly increase the rate at which articles are wrapped by the machine.

Because of the fact that an article is fed to one elevator platen simultaneously with the discharge of an article from another, it is necessary to sever the paper web and to operate a stripper to draw out the paper required for draping during each period between the dwell periods in which articles are simultaneously fed to and discharged from the elevator. In order to obtain maximum speed of operation means is preferably provided for performing the web severing and stripping operations while the elevator is moving.

The stripper operates to draw out a loop of paper alongside the elevator that extends down from the top of the article under the vertically movable stripper roller and upwardly from the stripper roller over a drape roller that is mounted in a fixed position above the feed station and that serves to support the leading end of the paper web in the path of an article being moved onto the elevator.

For severing the web the elevator is provided with a cutter blade mounted below each platen for movement into engagement with the paper web at a distance below the platen such that the severed web will provide a lap of the desired width upon the underside of the article. A web severing stroke is imparted to the cutter blades, while the stripper roller is being moved downwardly and while the elevator is moving, by means of a cam that is mounted in fixed position alongside the elevator for engagement successively with cutter actuating devices carried by the platens.

The cutter actuating cam is preferably adjustable vertically to change the timing of the web severing operation. Upward adjustment of the cutter actuating cam permits the stripper roller to move downwardly a greater distance before the web is severed and causes the drape to be lengthened. Downward adjustment of the cam causes the web to be severed when the stripper roller is further from its limit of downward movement to provide a shorter drape.

The width of the initial underlap is controlled by the adjustment of the cutter actuating cam and the width of the final underlap is determined by the spacing of the cutter blades from the platens, the cutter blades being preferably so mounted that they may be set at different distances below the platens. Since the widths of the laps of the wrapper on the underside of the articles can be accurately controlled by adjustment of the cutter actuating cam and the cutters, the width of the overlap at the adjoining edges of the wrapper on the bottom of the article can be reduced and a substantial saving of paper effected.

During the wrapping operation the article being wrapped exerts a pull on the wrapper web to draw out the paper required for wrapping the article and, in order to prevent any substantial variation in the tension applied to the paper web during the wrapping operation and in order to reduce the pull which the article exerts on the web during the wrapping operation, means is provided for maintaining a supply of paper in a slack loop between the paper roll and the wrapping mechanism from which paper is drawn at all times by the wrapping mechanism. In order to insure a supply of paper in the slack loop which is at all times sufficient to provide the paper necessary for articles being wrapped, an automatically controlled mechanism is provided for operating the paper feed. The operation of the paper feed is controlled by a moving slack roller that is actuated by suitable means such as a counterweight to keep the roller in engagement with the paper and to maintain a slight tension on the slack loop. As the slack loop is shortened this roller moves to a position where it engages a trip to start the operation of the paper feed mechanism. As the slack loop lengthens the slack roller moves to a point where it engages a second trip to discontinue the feed operation. In the latter position of the slack roller there is preferably enough paper in the slack loop to wrap a plurality of articles. The paper feed mechanism remains idle while the paper in the slack loop is drawn out by the wrapping mechanism, shortening the loop to a point where the slack roller operates the first mentioned trip which again starts the feed mechanism into operation.

The clutch disengaging trip is preferably positioned to disengage the clutch before the slack roller reaches the limit of its movement so that the slack loop may be lengthened after the clutch is disengaged to take up any paper that is fed by the over-running of the paper roll after the clutch is disengaged, so that it is not necessary to impose a heavy frictional drag on the paper feed driving mechanism to limit the overrun.

By providing an intermittent paper feed in which a supply of paper is maintained at all times in the slack loop which is more than sufficient to supply the paper required for wrapping the next article fed to the wrapping mechanism, there is never any more than a slight resistance to the pull of the wrapping mechanism on the paper web and soft loaves of bread can be wrapped without subjecting them to undesirable pressure.

The paper roll is preferably supported upon a pair of spaced horizontal rollers which may be driven in a direction to unwind paper from the roll. The use of supporting rollers instead of a roll supporting shaft is desirable, not only for the reason that they provide a support upon which it is convenient to mount a heavy paper roll, but also for the reason that the overrun of the paper roll due to its inertia can be more readily controlled. The supporting rollers and the roller driving chains provide a frictional resistance to rotation of the paper roll which reduces the overrun of the paper roll when the clutch of the driving mechanism is disengaged. By reason of the better control of the paper roll overrun, the machine of the present invention can employ heavy rolls of paper which will permit continuous operation of the wrapping mechanism for longer periods of time.

The invention has for an object to increase the speed of operation of wrapping machines of the character described.

A further object is to provide a wrapping machine of the type in which the article measures the paper required to wrap it and in which the paper is subjected to a light tension which is substantially uniform throughout the wrapping operation.

More specific objects of the invention are to provide a machine in which substantial portions of the wrapping operation are performed simultaneously upon a plurality of articles, in which the elevator has but a single dwell period during the wrapping operation, and in which the paper severing and stripping operations are performed during movement of the elevator.

Reference should be had to the accompanying drawings forming a part of this specification in which:

Figure 1 is a side elevation of a wrapping machine embodying the invention;

Fig. 2 is a top plan view of the machine with the conveyor that overlies the elevator omitted to expose the elevator and other parts beneath the same;

Fig. 3 is a fragmentary transverse vertical section taken on the line indicated at 3—3 in Fig. 1;

Fig. 5 is a fragmentary longitudinal vertical section on an enlarged scale taken on the line indicated at 5—5 in Fig. 2;

Fig. 6 is a fragmentary longitudinal vertical section on an enlarged scale taken on the line indicated at 6—6 in Fig. 2 and showing the roller gear in side elevation;

Fig. 7 is a fragmentary transverse section taken on the line indicated at 7—7 in Fig. 6;

Fig. 10 is a fragmentary front elevation of one of the elevator platens viewed as indicated at 10—10 in Fig. 8;

Fig. 10a is a sectional detail view showing a friction brake for retarding movement of the article engaging follower on an elevator platen;

Fig. 11 is a fragmentary vertical longitudinal section taken on the line indicated at 11—11 in Fig. 10;

Fig. 12 is a fragmentary, central, vertical, longitudinal section showing two elevator platens positioned, one at the article receiving station to receive an article from the feed conveyor, and the other at the discharging station where it is in alinement with the discharge runway of the machine;

Fig. 13 is a plan view of one of the web severing mechanisms;

Fig. 14 is an end elevation of the web severing mechanism shown in Fig. 13;

Figs. 15 and 16 are diagrammatic views showing the position of the wrapper web immediately before and immediately after the web severing operation, Fig. 15 showing the position of the web immediately prior to cutoff and Fig. 16 showing the wrapper severed from the web and the leading end of the web suspended in position for engagement with the next article to be wrapped;

Fig. 17 is a fragmentary side elevation of the feed conveyor;

Fig. 18 is a foreshortened transverse vertical section taken on the line indicated at 18—18 in Fig. 17;

Fig. 19 is a fragmentary side elevation of the overhead pusher conveyor which discharges the wrapped articles from the elevator;

Fig. 20 is a transverse vertical section taken on the line indicated at 20—20 in Fig. 19;

Fig. 21 is a fragmentary, central, vertical, longitudinal section on an enlarged scale taken on the line indicated at 21—21 in Fig. 2, showing the paper feed mechanism and the pusher for transferring articles to the elevator;

Fig. 22 is a front elevation of the drape table and paper feed control mechanism viewed as indicated at 22—22 in Fig. 21;

Fig. 23 is a fragmentary plan view of a portion of the drape table viewed as indicated at 23—23 in Fig. 21;

Fig. 24 is a fragmentary transverse vertical section taken on the line indicated at 24—24 in Fig. 23;

Fig. 25 is a fragmentary longitudinal vertical section taken on the line indicated at 25—25 in Fig. 22;

Fig. 26 is a fragmentary longitudinal vertical section taken on the line indicated at 26—26 in Fig. 22; and Fig. 27 is a fragmentary longitudinal vertical section taken on the line indicated at 27—27 in Fig. 22.

The wrapping machine of the present invention is of the type in which the article to be wrapped is engaged with the leading end of a web of wrapping material and in which the wrapping mechanism causes the web to be wound about the article, after which the web is severed to provide a wrapper for the article which is the length required for the particular articles being wrapped.

In the machine of the present invention articles are delivered to the machine by a transverse feed conveyor A from which articles are delivered to an elevator B by means of a pusher C, the article as it is moved onto the elevator being engaged with the leading end of a web of wrapping paper that extends from a paper roll D, the paper passing from the roll D over a drape table E and having its leading end suspended in the path of the article between the elevator B and the feed conveyor A. The wrapper web is partially wrapped around the article as it is transferred from the feed conveyor A to the elevator B and is drawn over the top and down across the front of the articles as the elevator is moved upwardly from the receiving station to the discharging station where the article is moved from the elevator into a folding and sealing channel F after the web has been cut to provide a wrapper of a suitable length for the article. The articles are moved from the elevator into the folding and sealing channel where the wrapping operation is completed by means of an endless continuously driven overhead pusher conveyor G which delivers the articles to a discharge conveyor H.

Figure 4:
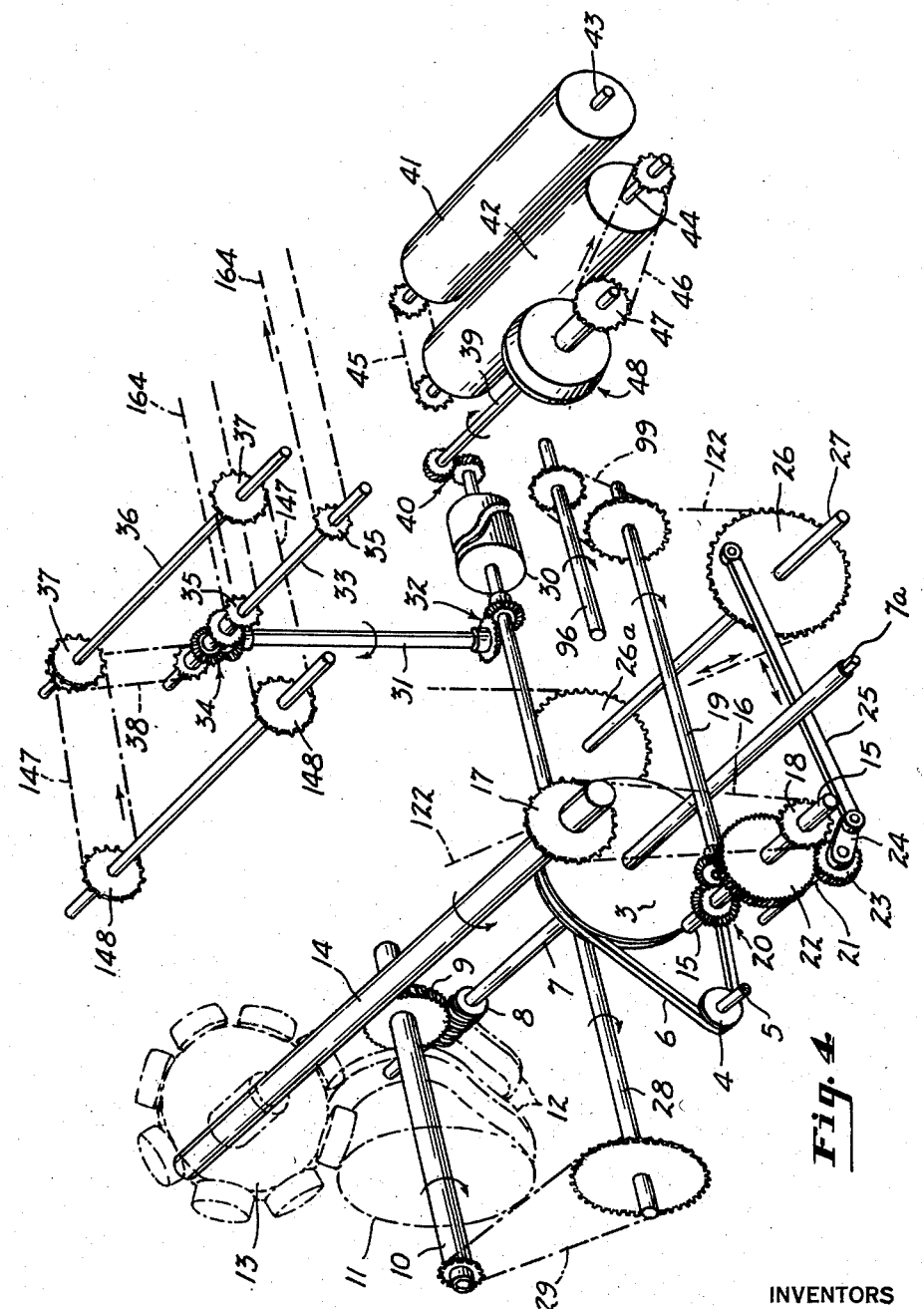
Fig. 4 is a diagrammatic perspective view showing the driving connections for the various parts of the machine.

The machine has a suitable frame 1 and is driven by an electric motor 2 within the lower portion of the frame adjacent the rear end thereof. As best shown in Fig. 4, the motor drives a large pulley 3 through a small pulley 4 on motor shaft 5 and a V-belt 6 that runs over the pulleys 3 and 4. This belt and pulley drive may be of the variable speed Reeves type if so desired. The pulley 3 is fixed to a transverse shaft 7 which is the main drive shaft of the machine and which may be provided with a squared end 7a accessible at one side of the machine to receive a hand crank for manual actuation. The shaft 7 has a worm 8 that meshes with a worm gear 9 on a shaft 10 at right angles to the shaft 7 which carries a driving cam 11 through which intermittent movement is imparted to various parts of the machine. The cam 11 has ribs 12 formed with successive helical and straight arcs and which engage with the rollers of a roller gear 13. The ribs 12 are so disposed that they engage successively with the rollers of the gear 13, the helical arc of the ribs 12 imparting a turning movement to the gear equal to twice the annular spacing of its rollers and the straight arc holding the gear against turning movement.

The roller gear 13 is fixed to a transverse shaft 14 which drives the elevator. A second transverse shaft 15 below the shaft 14 is driven by a sprocket chain 16 extending over a large sprocket 17 on the shaft 14 and a small sprocket 18 on the shaft 15. The shafts 14 and 15 and the parts driven by these shafts are actuated during the periodical turning movements of the roller gear 13 and are held stationary during the dwell periods of the gear 13. A longitudinal shaft 19 is driven by the shaft 15 through bevel gearing 20 and this shaft drives the feed conveyor A with movements during the movements of the elevator and with dwell periods corresponding to the dwell periods of the elevator.

A crankshaft 21 is also driven from the shaft 15 through spur gears 22 and 23, the ratio of the gears 22 and 23 being such that one revolution is imparted to the crankshaft 21 upon each actuation of the roller gear 13. The shaft 21 has a crank 24 to which is pivoted a connecting rod 25 that is pivoted to a sprocket 26 on a transverse shaft 27. The connecting rod 25 is connected to the sprocket 26 at a distance from the axis thereof considerably greater than the length of the crank arm 24 so that an oscillating movement is imparted to the sprocket 26 upon each revolution of the crankshaft 21. The actuation of the sprocket 26 occurs during movement of the roller gear 13 and while the elevator B is moving. The sprocket 26 serves to actuate a stripper which serves to pull out a predetermined length of wrapper web for engagement with the next article to be wrapped prior to severing from the web the portion thereof wrapped about an article on the elevator, as will be hereinafter more fully explained.

Parts of the machine whose movements need not coincide with movements of the elevator are driven by a longitudinal shaft 28 which is connected by a sprocket chain 29 to the continuously driven shaft 10 of the driving cam 11. The shaft 28 has a cam 30 mounted thereon that serves to actuate the pusher C for transferring articles from the feed conveyor A onto the elevator B. The shaft 28 also drives a vertical shaft 31 through bevel gearing 32 and the shaft 31 in turn drives a transverse shaft 33 adjacent the top of the frame through bevel gearing 34, the shaft 33 having sprockets 35 attached thereto through which the discharge conveyor H is driven. A transverse shaft 36 above the shaft 33 has sprockets 37 attached thereto through which the pusher conveyor G is driven, the shaft 36 being driven by the shaft 33 through a sprocket chain 38.

Adjacent the front end of the frame 1 a transverse paper feed operating shaft 39 is driven from the longitudinal shaft 28 through crossed helical gearing 40. The paper roll D is supported on a pair of horizontal rollers 41 and 43 mounted on shafts 43 and 44. The shafts 43 and 44 are connected for simultaneous rotation in the same direction by means of an endless sprocket chain 45 and a driving connection from the shaft 29 is provided by a second sprocket chain 46 running over a sprocket 47 rotatable on the shaft 39 and an automatically operable clutch 48 that is interposed between the sprocket 47 and the shaft 39. During operation of the machine the clutch 48 is automatically actuated to drive the rollers 41 and 42 in a direction to feed out paper from the roll D at intervals during operation of the machine.

The elevator B is directly connected to the intermittently driven roller gear 13 and the feed conveyor and the stripper mechanism are actuated by the intermittently driven gear 13 so that the movement of these parts occurs only during movement of the elevator. The remaining parts of the machines are driven from the constantly rotating shaft 10.

*Elevator*

The elevator B is of the endless type in which a plurality of uniformly spaced speed platens trail one another in an endless path. As herein shown the elevator is of the rotary type and is supported on two spaced wheels or spiders 50 fixed to the shaft 14 adjacent opposite sides of the frame 1. The wheels 50 support four equiangularly spaced pivot or trunnion shafts 51 which are parallel to and equidistant from the shaft 14. Arms 52 extend downwardly from each of the shafts 51 adjacent one of the wheels 50 and the axially alined trunnion shafts 51 are connected by rigid T-section cross member 53. The arms 52 are all disposed vertically adjacent one of the wheels 50 and outside the wheel as shown in Fig. 10 and are connected to a control ring 54 by pivots 55 at the lower ends thereof. The pivots 55 are equiangularly spaced about the center of the control ring 54 and at the same radial distance from the center of the ring 54 as the pivot shafts 51 from the axis of the shaft 14.

A pair of rollers 56 are mounted in fixed positions on the frame 1 and interiorly engage the ring 54 at diametrically opposite points to constrain the movement of the ring 54 to rotary movement about its own center. The control ring serves to hold the arms 52 in vertical position and the arms 52 being fixed to the shafts 51 hold the cross members 53 against angular movements about the axes of the shafts 51 during rotation of the elevator. A pair of horizontally disposed channel guides 57 are mounted upon the tops of the cross members 53 and the guides of each pair which are adjacent the opposite ends of the members 53, provide supports for four horizontally slidable platens 58 which are equiangularly spaced with respect to the shaft 14 and which trail one another in a circular path during rotary movements of the elevator. Springs 59 attached at their forward ends to the guides 57 and at their rear ends to the platens 58 exert a forward thrust on each of the platens and normally hold each platen in a position in engagement with a cushioning stop block 60 which may be formed of rubber and which is attached to a guide 57. The platens 58 are made slidable on the guides 57 in order to permit them to be guided during the portion of the revolution of the elevator in which they carry articles being wrapped. Each of the platens carries a roller 61 adjacent each end thereof and the rollers 61 are engageable with vertical guide posts 62 which serve to constrain the platens to straight line vertical movement from a receiving station in alinement with the feed conveyor A, to a discharge station where the platen alines with the folding channel F. The posts 62 may be provided with curved lower end portions 63 which serve to lessen the impact on the platen due to engagement of the rollers 61 with the guide posts.

Each platen 58 has a paper clamping follower 64 mounted thereon which serves to clamp the wrapper web to the article when the article is transferred from the feed conveyor to the elevator. Each follower 64 slides upon the top face of its platen and is of a length to extend substantially across the major portion of the width of the platen. As best shown in Fig. 10, the article engaging portion of the follower has a high central portion 65 which is relatively narrow and end portions 66 which are relatively low. The follower has a central rearwardly extending bar 67 that slides on the top face of the platen and that extends past the rear edge of the platen. To the rear end of the bar 67 there is attached a guide bar 68 which is parallel with the bar 67 but which slides in a guide 69 on the under face of the platen. The friction of the guide 69 may serve to hold the follower in any position in which it is moved, the follower being moved rearwardly on the platen by the pressure of an article being pushed onto the elevator and being returned by the overhead pusher conveyor G to a position near the forward edge of the platen upon discharge of the article from the platen. In order to more accurately regulate the friction acting to retard movement of the follower 64, an adjustable brake 69a such as shown in Fig. 10a may engage with the guide bar 68.

Figure 9:
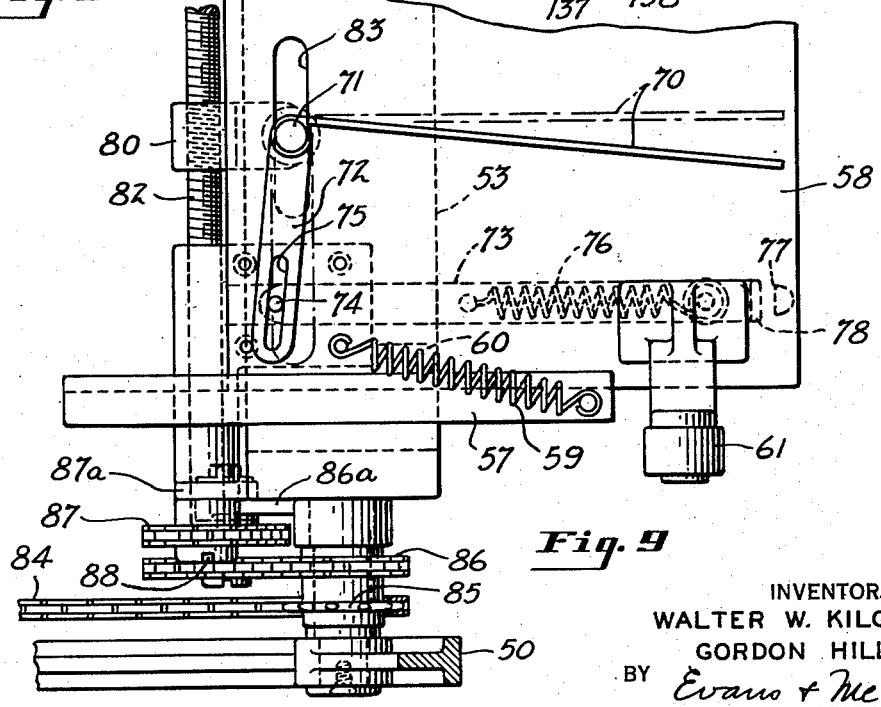
Fig. 9 is a fragmentary plan view of one end of an elevator platen viewed as indicated at 9—9 in Fig. 8.

Each platen carries a pair of horizontally swingable tucker plates 70 which are attached to vertical pivot posts 71. The tucker plates 70 serve to clamp the paper web against opposite ends of an article being wrapped and are so controlled that their forward ends are swung apart sufficiently to permit the article to be entered between them at the receiving station and are swung into clamping engagement with the article when the platen begins its movement from the receiving station to the discharge station. As shown in Fig. 9, each of the pivot posts 71 has a horizontal arm 72 attached to its lower end beneath the platen. Each arm 72 is actuated to swing the tucker plate carried by the post to which it is attached by means of a slide bar 73 mounted on the under side of the platen and movable toward and away from the forward edge of the platen. Each slide bar 73 carries a pin 74 that engages in a slot 75 in the arm 72 which it actuates. A spring 76 exerts a forward thrust on each slide bar 73 and normally holds it in engagement with a stop lug 77 on the under side of the platen adjacent its forward edge. The stops 77 limit the forward movement of the slide bars 73 and normally hold the tucker plates 70 in positions at right angles to the axis of the elevator. Each of the slide bars 73 has a down-turned forward end 78 that is engageable with a roller 79 mounted in fixed position on the machine frame adjacent the article receiving station so that the slides 73 are pushed rearwardly and the forward ends of the tucker plates 70 are swung outwardly to receive an article from the feed conveyor A at the receiving station. Each pivot post 71 is mounted on a support 80 positioned beneath the platen and the supports 80 beneath each platen are carried on a screw shaft 82 mounted on the under side of the platen and movable therewith. Each shaft 82 has right and left hand screw portions engaging the spaced supports 80 carried by it for simultaneously and equally adjusting the supports 80 and their posts 71 toward and away from one another by rotation of the shaft 82. Each platen is provided with slots 83 parallel to its shaft 82, permitting movement of the posts 71 that extend through it. By means of the screw shafts 82 the tuckers 70 may be adjusted to accommodate articles of various lengths, the tucker plates 70 being supported above the end portions 66 of the follower 64 so that the follower may engage the articles throughout the length thereof without interfering with movements of the tucker plates 70.

Figure 8:
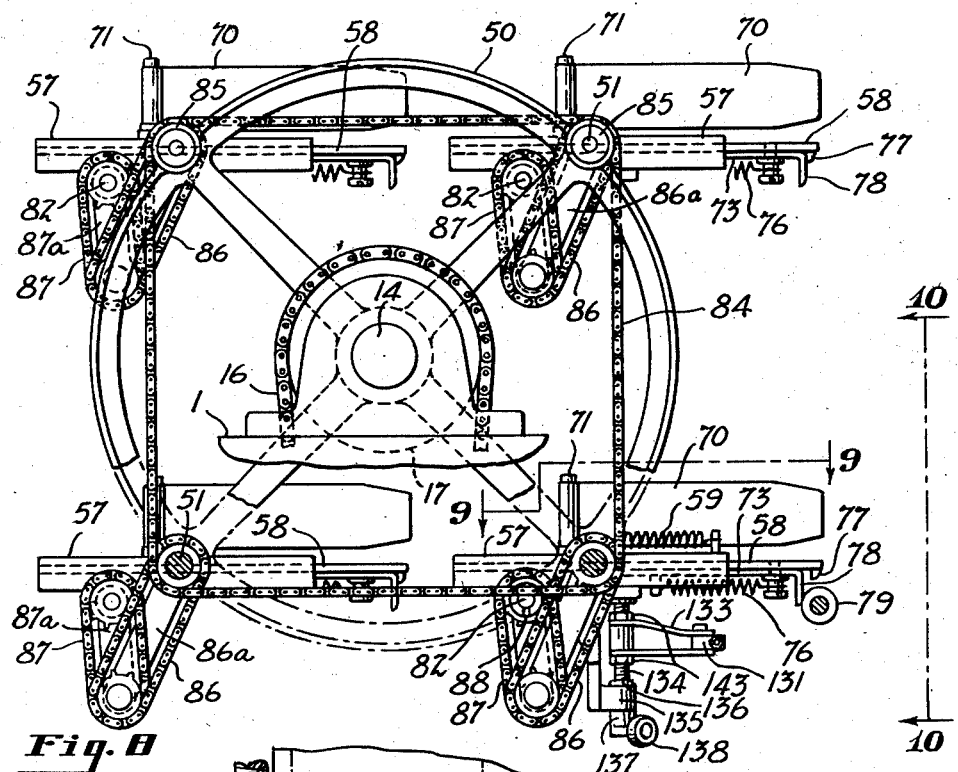
Fig. 8 is a fragmentary vertical longitudinal section on an enlarged scale taken on the line indicated at 8—8 in Fig. 2 showing the elevator in side elevation.

Means is preferably provided for simultaneously adjusting the tucker plates on all of the platen and, as best shown in Fig. 8, this adjustment is effected by means of an endless sprocket chain 84 that runs over a sprocket 85 on each of the trunnion shafts 51. A driving connection is provided between each sprocket 85 and the adjacent screw shaft 82 through sprocket chains 86 and 87 that are movable with links 86a and 87a that are pivoted to the shafts 51 and 82 and to one another at their lower ends to maintain the driving connection in all positions of the platen. Since the driving connection is between the chain 84 and each of the screw shafts are identical, any turning movement imparted to the shafts 82 will be identical and the adjustments of the tucker plates 70 will be equal. One of the screw shafts 82 may be provided with means by which it may be turned manually to effect the desired adjustment of the tuckers. As shown in Fig. 8, a notched collar 88 is provided on one of the shafts 82 for engagement with a hand crank.

*Article feed mechanism*

As best shown in Figs. 2 and 17, the feed conveyor A has parallel endless sprocket chains 90 and 91, the chain 90 having longitudinally alined plates 92 attached thereto that are regularly and closely spaced and the chain 91 having longitudinally alined closely spaced plates 93 attached thereto. The chains 90 and 91 run over supporting and driving sprockets 94 and 95 mounted on a shaft 96. The top run of the conveyor A is horizontal and the plates 92 and 93 provide a flat article supporting top run on which articles being fed to the wrapping machine are carried. The sprocket 94 is fixed to a sleeve 97 rotatable on the shaft 96 and the sprocket 95 is keyed to the shaft 96. The conveyor A is driven through a sprocket 98 on the shaft 96 which is driven by a sprocket chain 99 from the shaft 28. The sprocket 98 is rotatable on the shaft 96 and is connected to the sprockets 94 and 95 through a pair of disks 100 and 101, the disk 100 being keyed to the shaft 96 and the disk 101 being fixed to the sleeve 97 as best shown in Fig. 18. Means is provided for securing the disks 100 and 101 together in different positions of relative angular adjustment so as to impart a relative angular adjustment to the sprockets 94 and 95 of the conveyor. The two disks 100 and 101 are clamped together in adjusted positions by a clamping bolt 102 that extends through the disks 100 and 101 and through an intermediate member 103 that forms the hub of the sprocket 98. The clamping bolt 102 passes through arcuate slots 104 and 105 in the disks 100 and 101 which permit angular adjustment of the disks when the clamping bolt 102 is loosened.

For effecting equal and opposite angular movements to the disks 100 and 101, a bevel pinion 106 journaled in the hub 103 meshes with toothed segments 100a and 101a of the disks and is provided with a squared shaft 107 which may be engaged with a suitable wrench or the like to turn the pinion 106 to impart the desired adjustment to the sprockets 94 and 95, after which the clamping bolt 102 is tightened to secure the sprockets in their adjusted position. Transversely extending upright positioning plates 108 are attached at equally spaced points to the plates 92 carried by the chain 90. Similar transverse upright positioning plates 109 are attached to plates 93 on the chain 91 and are spaced from the plates 108 a distance corresponding the length of articles being wrapped.

Each article is delivered to the conveyor A between a pair of upright positioning plates 108 and 109. The plates 108 and 109 extend across the entire width of the conveyor, the plates 108 being attached to the plates 92 and overlying the plates 93 and the positioning plates 109 being attached to the plates 93 and overlying the plates 92. By adjusting the sprockets 94 and 95 through equal and opposite angles, the spacing of the plates 108 and 109 may be adjusted to accommodate articles of various lengths while maintaining a uniform spacing of articles on the conveyor. Since the plates 108 and 109 are adjusted equally toward and away from a point midway between them and since the feed conveyor is moved upon each actuation a distance corresponding to the spacing of adjacent pairs of positioning members, the articles will always be properly centered with respect to the elevator, regardless of the adjustment of the positioning members on the conveyor.

As best shown in Figs. 1 and 21, the pusher C, which transfers the articles from the feed conveyor A to the elevator platens, has an article engaging head 110 which is preferably formed of telescopically connected parts so that it can be extended to various lengths for articles of different sizes. The head 110 is carried by a horizontal rod 111 that is slidably mounted in bearings 112 and 113 in a supporting bracket 114. As best shown in Figs. 21 and 22, the rod 111 has a cross member 115 attached thereto between the bearings 112 and 113. Links 116 are attached to opposite ends of the cross member 115 and are pivotally connected to a forked upper end 117 of a lever 118 that is pivoted to swing about a transverse axis adjacent the base of the frame 1. The pusher is actuated at proper time intervals by means of the cam 30 on the shaft 28, the lever 118 having a roller 119 engaging with the cam 30 through which an oscillating stroke is imparted to the lever 118 during each dwell of the feed conveyor A and elevator B. In the operation of the machine the elevator is driven intermittently to impart a quarter turn to the wheels 50 to move a platen from a receiving station alongside the feed conveyor A to a discharge station adjacent the sealing channel F, each actuation being followed by a dwell during which one elevator platen is positioned at the receiving station and another platen is positioned at the discharging station. During each actuation of the elevator the feed conveyor is actuated to bring an article into alinement with a platen on the elevator and during each dwell period the pusher C is actuated to transfer an article from the feed conveyor to the platen on the elevator.

*Drape forming and web severing mechanisms*

The wrapper web passes from the drape table E over a drape roller 120 that is positioned adjacent the front of the elevator and above the feed conveyor A. The roller 120 is mounted for vertical adjustment in slotted brackets 120a attached to the frame 1 so that it may be positioned close to the top of the article being wrapped, adjusted positions being indicated in dotted lines in Fig. 21. The leading end of the wrapper web extends over the roller 120 downwardly between the conveyor A and the adjacent elevator platen so that the free end of the web is dragged into a position underneath the article as the article is pushed onto the elevator platen. A stripper roller 121 extends across the space between the front and back of the frame adjacent the front of the elevator and is movable downwardly into engagement with the wrapper web during upward movement of the elevator as is shown diagrammatically in Figs. 15 and 16. The roller 121 is attached at its opposite ends to endless sprocket chains 122 that are positioned adjacent the front and back of the frame 1. One of the endless chains 122 extends over the oscillating sprocket 26 and the other chain 122 extends over an identical sprocket 26a affixed to the shaft 27 adjacent the back of the machine frame. The chains 122 extend over horizontally alined guide sprockets 123 and 124 positioned a short distance below the folding channel F, the sprocket 124 being positioned adjacent the elevator and the chains being guided vertically between the sprockets 124 and a pair of sprockets 125 that are mounted on stub shafts 126 and that engage the chains exteriorly closely adjacent the conveyor A as best shown in Figs. 5 and 12. The sprockets 125 are spaced apart a distance sufficient to permit the platens to pass between them and the chains 122 are guided at an inclination beneath the sprockets 125 by means of rearwardly offset sprockets 126 that engage the chains interiorly. By offsetting the guide sprockets 126 rearwardly the stripper roll is guided past a roller 129 that is positioned alongside the conveyor A and that serves to hold the end of the paper web out of engagement with the conveyor and to support articles during their movement from the conveyor A to the elevator platen. During each movement of the elevator the stripper roller 129 is moved downwardly to pull a portion of the paper web downwardly into the space between the elevator and the feed conveyor so that when the web is severed the end of the web will fall into engagement with the positioning roller 129 as shown in Fig. 16.

The web is severed by means of a slicer blade 130 which, as best shown in Figs. 13 and 14, is detachably mounted in a horizontally disposed holder bar 131 and held under tension by means of an adjustable attaching slip 132. The slicer blade has a scalloped cutting edge and is mounted to swing toward the paper web and transversely thereof to sever the web with a slicing stroke. A web severing cutter is movably mounted beneath each of the elevator platens and each cutter is carried by two parallel swinging arms 133 which are pivotally attached to the holder 131 adjacent the ends thereof. The arms 133 are carried by pivot posts 134 that are rotatably mounted on the cross members 53. The upper ends of the posts 134 are journaled in the forwardly projecting top flange of the cross member 53 and the lower ends of the posts are journaled in brackets 135 formed integrally with the cross member. Each post 134 is provided with a circumferential flange 136 that rests on the top face of its supporting bracket 135 and one of the posts of the pair carried by each of the cross members has a laterally projecting arm 137 attached to its lower end that is provided with a roller 138 that is engageable with a cam 139 attached to the frame 1. The cam 139 is adjustable vertically to vary the timing of the cutoff stroke with respect to the movement of the stripper roller 121 so as to increase or decrease the length of the draped end of the wrapper web with which the next article to be wrapped engages, thereby providing an initial underlap of the desired width. The cam 139 may be mounted on one of the vertical guide posts 62 and secured in adjusted position thereon by means of a bolt 140 extending through a vertical slot 141 in the cam.

Means is preferably provided for adjusting each web severing cutter vertically with respect to the platen on which it is mounted in order to sever the paper web at different distances below the platen and thereby to regulate the width of the final underlap. As best shown in Fig. 14, each arm 133 is attached to a sleeve 142 on a post 134 and each post 134 is threaded to receive nuts 143 that serve to clamp the sleeve 142 and arms 143 in different positions of vertical adjustment on the post. Each of the cutters is held in retracted position by means of a spring 144 that is attached at one end to one of the cutter carrying arms 133 and at its opposite ends to a bracket 145 that is attached to the supporting crossbar 53. Movement of the cutter holding bar 131 toward the support 53 is limited by a rearwardly projecting pin 146 on the bar 131 that engages with the bracket 145 as best shown in Fig. 13.

The stripping and web severing mechanisms operate during the travel of the elevator so that the dwell period need only be long enough to permit the transfer of an article to an elevator platen at the receiving station and the simultaneous discharge of an article from an elevator platen at the discharging station. By adjusting the timing of the web severing operation with respect to the movement of the stripper and by adjusting the position of the cutters with respect to the platens, the amount of overlap of the edges of the wrapper across the bottom of the article being wrapped can be accurately regulated and a substantial saving of wrapping material can be effected.

*Article discharging and final folding devices*

The endless pusher conveyor G comprises a pair of endless chains 147 that run over the sprockets 37 attached to the continuously driven shaft 36 and over a pair of rear sprockets 148 positioned directly over the elevator B and spaced pusher arms 149 attached to each of the chains 147. The pusher arms 149 on the two chains 147 are transversely alined and each carries a pivoted angle-shaped article engaging plate 150 that is connected to the lower end of its arm by a pivot 151. The upright article engaging portion of each plate 150 carries a cushioning block 152 that engages with the front edge of the pusher arm and the horizontal rearwardly extending portion of the plate carries a cushioning block 153 that engages with the under side of a rearward projection 154 formed on the pusher arm. Each pusher arm 149 has a right angled bend adjacent its upper end and at this bend there is mounted a roller 155.

The lower runs of the conveyor chains 147 are guided in a channel guide member 156 and the rollers 155 of the pusher arms travel in a channel guide 157 parallel to and between the guides 156. The travel of the conveyor G is so timed with respect to the elevator that a pair of pusher arms 149 sweeps across an elevator platen at the discharging station during each dwell of the elevator. The plates 150 engage with the low portions 66 of the follower 64 to move the follower toward the forward edge of the platen and push the article into the folding and sealing channel F. At the ends thereof over the elevator B the guides 156 and 157 have curved portions 158 and 159 which serve to lift the pusher arms 149 clear of the end portions 66 of the follower 64 at a point near the forward edge of the elevator, after which the plates 150 engage directly with the article to push it through the folding channels.

The elevator platens travel in a straight line vertically from the article receiving position to the article discharging position and the edges of the wrapper web projecting beyond the ends of the article being wrapped at the top thereof are engaged by top folders 160 which fold these edges downwardly over the ends of the article. Since there is no change in direction of movement of the articles during the downward folding of the edges of the wrapper, a smooth fold is formed.

A roller 161 is positioned at the entrance end of the folding and sealing channel F and the side plates 162 of the folding channel are provided with forwardly extending upwardly inclined slots 163 that receive the edges of the wrapper that project beyond the ends of the article at its bottom and fold in these projecting ends upwardly against the end of the article. Suitable heating means (not shown) in the bottom and side walls of the folding channel serve to fuse the wax or other thermoplastic coating on the wrapping material to seal the wrapper. The discharge conveyor H has spaced parallel endless chains 164 to which pusher flights 165 are attached. The conveyor H is preferably driven at a speed lower than that of the pusher conveyor G and the spacing of the pusher flights 165 is less than that of the pusher arms 149, the relative speed of the two conveyors being such that the pusher arms 149 deliver the wrapped articles into the spaces between the flights 165.

*Paper feed mechanism*

As best shown in Fig. 21, the drape table E has spaced top and bottom walls 166 and 167 which provide an elongated slack receiving chamber 168 between them. The paper web from the roll D is guided over a guide roller 169 at the forward end of the bottom wall 167 of the drape table and passes rearwardly around a slack roller 170 within the chamber 168, forwardly around a guide roller 171 at the forward end of the top wall 166 and rearwardly over the top of the drape table to the drape roller 120. The slack take-up roller 170 is mounted for longitudinal travel within the slack chamber 168 in guide channels 172 provided at opposite sides of the slack chamber 168. Links 173 extending forwardly from the ends of the roller 170 are pivotally connected at their rear ends to the upper ends of arms 174 that are attached at their lower ends to a transverse shaft 175 mounted in the base portion of the frame 1. An arm 176 attached to the shaft 175 carries a counterweight 177 that tends to swing the arms 174 rearwardly so as to main a light thrust on the slack roller 170 which tends to move the roller 170 rearwardly in its guides to increase the length of the slack loop within the chamber 168. As best shown in Figs. 23 and 24, the roller 170 is rotatably supported at its ends on stub shafts 178 that are provided with rollers 179 that travel in the guide channels 172. Each of the stub shafts 178 has a projecting end portion 180 to which a link 173 is attached. The channel guides 172 preferably extend substantially the full length of the chamber 168 and means is provided for automatically controlling the driving mechanism for the rollers 41 and 42 to maintain enough slack in the chamber 168 to supply the demand of the machine.

To control the paper feed mechanism, the clutch 48 is actuated by mechanism that is controlled by the forward and rearward movements of the slack roller 170. As best shown in Figs. 25 and 27, the shaft 175 has a short arm 181 attached thereto that carries a roller 182 that is engageable with spaced arms 183 and 184 of a yoke-shaped trip arm 185 that is attached to a transverse shaft 186 that is positioned above the shaft 175. The trip arm 185 serves to actuate the clutch 48 and is powered by a spring 187 that is attached at its upper end to a pin 188 projecting from the upper end of an arm 189 secured to the shaft 186 and extending upwardly therefrom. The lower end of the spring 187 is attached to a bracket 190 directly beneath the shaft 186 and attached to the base portion of the frame 1. Engagement of the roller 182 with either of the arms 183 or 184 of the trip lever 185 serves to move the pin 188 rearwardly or forwardly past the vertical plane of the shaft 186, after which the spring 187 imparts a further turning movement to the shaft 186 to actuate the clutch 48.

The clutch actuating connection includes a forked arm 191 fixed to the shaft 186 and engaging with a roller 192 on a sliding cam bar 193. The arm 191 extends downwardly from the shaft 186 and the roller 192 is at the forward end of the cam bar 193 which is guided for horizontal movement forwardly and rearwardly in a fixed guide member 196. The extent of movement of the cam bar 193 forwardly and rearwardly is limited by spaced stop pins 194 carried by a stationary frame member 195 and positioned in the path of the arm 189 to limit the turning movements of the shaft 186. The cam bar has a top face that is provided with an inclined shoulder portion 197 and that engages with a roller 198 which, as best shown in Fig. 23, is mounted on the free end of a horizontal arm 199 of a bell-crank lever 200 which has a vertical arm 202 that engages a grooved hub 203 of a movable clutch member 204 that is slidably mounted on the shaft 39. The clutch member 204 of the clutch 48 is of conical form and engages an internally conical clutch member 205 that is rotatably mounted on the shaft 39 and that has a hub portion 206 to which the driving sprocket 47 is attached. The clutch member 205 is continuously driven by means of the sprocket chain 46 and drives the shaft 39 through a collar 107 keyed to the hub of the clutch member 204 when the clutch member 204 is engaged with the clutch member 205. The clutch member 204 is normally held in disengaged position by means of a spring 208 that exerts a downward pressure on the lever arm 199.

Whenever the slack roller 170 is moved forwardly far enough to cause the trip arm 181 to engage the arm 183 of the trip lever 185, the arm 189 is swung rearwardly to carry the pin 188 to a position rearwardly of the axis of the shaft 186, whereupon the spring 187 continues the movement, swinging the yoke arm 191 forwardly to move the cam shoulder 197 into engagement with the roller 198 to shift the clutch member 204 to engaging position to start the drive of the rollers 41 and 42 in a direction to deliver more paper to the slack loop. The feeding of the paper to the slack loop continues until the control arm 174 is swung rearwardly to a point where the arm 181 engages the arm 184 of the trip member 185, causing the arm 189 to be swung forwardly to a position where the spring 187 snaps the cam bar 193 rearwardly to bring the low portion of the cam bar 193 beneath the roller 198, whereupon the clutch member 204 is shifted to disengaged position by the spring 208.

The trip mechanism is actuated to engage and disengage the clutch 48 with the roller 170 intermediate the ends of the guide channels 172 and the trip mechanism permits the guide roller to travel in its guides 172 past either of its trip actuating positions. The trips are so positioned that the minimum amount of paper in the slack loop is more than enough to wrap a single article and paper may be fed into the slack loop considerably in excess of the amount required to disengage the paper feed operating clutch. This insures an ample supply of paper at all times to the wrapping mechanism and also limits the tension on the wrapper web during the wrapping operation. By limiting the tension on the web to a very light tension during the wrapping operation, soft articles such as warm sliced loaves of bread can be wrapped without distortion. By permitting the slack roller 170 to move forwardly past its trip actuating position, an increase in tension on the web due to momentary demands for paper by the wrapping mechanism in excess of the rate at which paper is fed by the feed mechanism will not result in an increase in tension on the portion of the web being wrapped about an article. By permitting an amount of paper in the slack loop considerably in excess of the normal requirements of the machine, some over-running due to the inertia of the paper roll is permitted, so that it is unnecessary to provide a strong friction brake for retarding the rotation of the paper roll.

The supporting of the paper roll on the rollers 41 and 42 interposes a considerable frictional resistance to over-running of the paper roll, since the paper roll must drive the supporting rollers and the driving connections of the rollers during any overrun. This friction of the driving connections is ordinarily sufficient to keep the paper over-run within desirable limits. In order to maintain the paper roll in proper engagement with its two supporting rollers 41 and 42, means is preferably provided for maintaining the paper roll properly centered with respect to the two supporting rolls as the paper is unwound therefrom. As best shown in Figs. 2 and 21, a shaft 209 extends through the hollow core of the paper roll and is secured to the roll by means of a flange 210 that engages one end of the roll and a retaining plate 211 that engages the other end of the roll. The plate 211 is held in place by a collar 212 that is attached to the shaft 209 by means of a set screw 213. A collar 214 is detachably secured to the shaft 209 outwardly of the flange 214 by means of a set screw 215 and has a flange 216 that engages in a vertical channel guide 217 which serves to hold the roll D in a central position with respect to the supporting rollers 41 and 42 as the diameter of the roll D is decreased by the unwinding of paper therefrom.

During the operation of the machine paper is pulled from the slack loop in the chamber 168 by the wrapping mechanism and sufficient paper is maintained in the slack loop to supply the requirements of the wrapping mechanism at all times. Since it is necessary to maintain a slight pull on the paper in the slack loop and since the pull of the wrapping mechanism is discontinued each time the web is severed, means is provided for preventing reverse movement of the paper web on the drape table E. This reverse movement is prevented by means of an automatic brake in the form of a rubber paper engaging shoe 218 carried by an arm 219 pivoted on a shaft 220 extending across the drape table above the same. The arm 219 is inclined forwardly so that it engages the paper rearwardly of the shaft 220 and a reverse pull on the paper web with which the shoe 218 engages tends to swing the arm 218 towards its vertical position, applying pressure to the shoe 218 to clamp the web to a roller 218a mounted in the drape table with the top thereof substantially flush with the top surface of the table to prevent reverse movement thereof.

*Operation*

In the operation of the machine articles are delivered to the feed conveyor A and are positioned on the feed conveyor A between successive pairs of positioning plates 108 and 109. The feed conveyor A and the elevator B are actuated intermittently and simultaneously so that an article on the feed conveyor is brought into alinement with an elevator platen at the receiving station after each actuation. The pusher C is actuated by the cam 30 in timed relation to the movements of the elevator and feed conveyor to push an article off the feed conveyor A onto a platen 58 of the elevator during the dwell of the elevator and feed conveyor. In moving from the feed conveyor A to the elevator the article engages the leading end of the wrapper web which is draped over the roller 120 and between the positioning roller 129 and the elevator platen. As the article is pushed onto an elevator platen 58 the paper web is clamped between the follower 64 and the article, and the end of the paper web is folded against the under side of the article.

During the final portion of the movement of the elevator the tucker plates 70 on the platen brought into receiving position at the receiving station are swung open by engagement of the downturned ends 78 of the slide bars 73 with the rollers 79. Immediately upon the start of the upward movement of the elevator platen, the ends 78 of the tucker actuating slides 73 are moved out of engagement with the rollers 79 and the tuckers are swung by their springs 76 into engagement with the ends of the article on the elevator platen to fold edge portions of the paper web against the ends of the article and clamp the paper web to the article during the vertical travel of the elevator.

During the upward travel of the platen from the receiving station to the discharging station, downward movement is imparted to the stripper roller 121 by means of the connecting rod 25 that is actuated at predetermined intervals by the crank shaft 21 that is driven from the roller gear 13 which imparts movement to the elevator.

During the downward movement of the stripper roller 121 the cutter blade 130 is actuated by the cam 139 to sever the wrapper that is clamped to the article on the elevator platen from the web. By adjusting the cam 139 upwardly or downwardly, the timing of the cutting stroke with respect to the movement of the stripper roller 121 can be retarded or advanced to increase or decrease the length of the drape positioned in the path of the articles to be wrapped.

By adjusting the cutter blades 130 upwardly or downwardly with respect to the platens beneath which they are mounted, the length of the portion of the wrapper below the forward face of the article when the article is pushed into the folding channels can be decreased or increased. By adjustment of the cam 139 and of the cutter blade 130, the width of the overlap of the edge portions of the wrapper positioned against the bottom of the article may be regulated to prevent use of more paper than necessary, thereby effecting a substantial saving in paper.

The platen carrying an article with its wrapper wound about it and clamped to it, is brought to the discharging station simultaneously with the positioning of another platen at the receiving station directly beneath the discharging station. The article discharging pusher conveyor G is driven continuously at a speed so timed with respect to the movements of the elevator that a pusher arm is moved across the elevator platen to discharge the article from the elevator simultaneously with the movement of an article on or off the feed conveyor A onto the platen at the receiving station. As the article approaches the discharging station the projecting ends of the wrapper web at the top of the article are engaged with the top folding plates 160 which fold the edges of the wrapper downwardly over the ends of the article. As the article is moved off the elevator platen into the folding channel F the projecting edges of the paper at the bottom of the article are engaged in the slots 163 in the side plates 162 of the folding channel and are folded up against the end of the article. In the passage through the folding channel the overlapping folds of the wrapper are heated to seal the wrapper and the completely wrapped article is delivered to the discharge conveyor H.

By reason of the simultaneous feeding of an article to and discharge of an article from the elevator platens, substantial portions of the wrapping operation are performed simultaneously on two different articles being wrapped and by performing the stripping and cutting operations during travel over the elevator, the dwell of the elevator need be only of sufficient duration to permit the pusher to feed an article onto one platen and discharge an article from another. The provision of an elevator having article receiving platens that trail one another in an endless path makes it possible to perform the cutting and stripping operations on one article simultaneously with the performance of initial wrapping operations on a second article, and, since the elevator has movement in one direction only, its driving mechanism is greatly simplified.

During the movement of an article from the feed conveyor onto the elevator and during the upward movement of the elevator from the receiving station to the discharging station, the paper web is advanced over the drape table E toward the elevator, first by the engagement of the article with the draped end of the wrapper web and the rearward movement of the article onto the elevator while the wrapper web is clamped between the article and the follower 64, and then by the upward movement of the elevator platen which causes the paper to be drawn down over the front face of the article. Paper is also pulled rearwardly over the drape table by the action of the stripper roller 21 which occurs during the movement of the elevator.

In order to prevent the exertion of anything more than a light pull on the paper web during the wrapping operation in which the leading end of the web is wrapped about an article, means is provided for maintaining an ample supply of paper in a slack loop in the chamber 168 and for automatically controlling the feed of paper to the slack loop, so that the wrapping mechanism is never required to exert any more pull on the wrapper web than is necessary to overcome the action of the counterweight 177 on the slack roller 170. To prevent reverse movement of the paper web on the drape table E due to the pull of the slack roller 170 when the pull exerted by the wrapping mechanism is released for example by severance of the web, the reverse movement brake 218 is provided.

The controlling mechanism for the paper feed is operated by trips that are actuated by a member connected to the slack roller 170 and operating to engage and disengage the paper feeding clutch at predetermined positions of the roller 170 in the guide channels 172. The trip members do not interfere with movements of the roller 170 in either direction in the slack chamber 168, so that tension is never transmitted from the wrapping mechanism past the slack roller and special means need not be provided to limit the overrun of the paper feed roll.

It is to be understood that in accordance with the provisions of the patent statutes, variations and modifications of the specific devices herein shown and described may be made without departing from the spirit of the invention.

What we claim is:

1. A wrapping machine comprising an elevator having spaced article supporting platens that trail one another in an endless path with a vertical run in which the platens travel upwardly, means for driving said elevator intermittently in one direction with a dwell following each advancing movement in which two successive platens are in said vertical run, means for supporting a wrapper web with its leading end adjacent said vertical run, means operable during each dwell for engaging an article to be wrapped with the leading end of said web and moving the same onto the lower of said two platens in said vertical run and for clamping the leading end of said web to said article and to said platen, means for guiding said web during movement of the elevator to cause the same to wind about the article, means for severing said web after it is clamped to said platen at a predetermined distance below said platen to provide a wrapper for said article, and means operable during each dwell of the elevator for discharging an article enveloped by its wrapper from the upper of said two platens.

2. A wrapping machine comprising an elevator having spaced article supporting platens that trail one another in an endless path with a vertical run in which the platens travel upwardly, means for driving said elevator intermittently in one direction with a dwell following each advancing movement in which two successive platens are in said vertical run, means for supporting a wrapper web with its leading end adjacent said vertical run, means operable during each dwell for engaging an article to be wrapped with the leading end of said web and moving the same onto the lower of said two platens in said vertical run and for clamping the leading end of said web to said article and to said platen, means for guiding said web during movement of the elevator to cause the same to wind about the article, means for severing said web during movement of said elevator at a distance from its clamped end to provide a wrapper for said article, and means operable during each dwell of the elevator for discharging an article enveloped by its wrapper from the upper of said two platens.

3. In a wrapping machine, an elevator having uniformly spaced article supporting platens that trail one another in an endless path a portion of which is substantially vertical, means for driving said elevator intermittently in one direction with dwells at intervals such that two successive platens are positioned in said vertical portion of said path, one at an article receiving station and the other at an article discharging station during each dwell, means operable during each of said dwells for simultaneously moving an article onto the platen at said receiving station and an article off the platen at said discharging station, means for clamping the leading end of a wrapper web to an article and to the platen onto which it is moved at said receiving station, and means for severing said web at a point spaced from said platen during the travel of said platen from the receiving station to said discharging station.

4. In a wrapping machine, an elevator having uniformly spaced article supporting platens that trail one another in an endless path a portion of which is substantially vertical, means for driving said elevator intermittently in one direction with dwells at intervals such that two successive platens are positioned in said vertical portion of said path, one at an article receiving station and the other at an article discharging station during each dwell, means operable during each of said dwells for simultaneously moving an article onto the platen at said receiving station and an article off the platen at said discharging station, means for clamping the leading end of a wrapper web to an article and to the platen onto which it is moved at said receiving station, and means controlled by movements of said elevator for severing said web during the travel of a platen to which the web is clamped from the receiving station to the discharging station.

5. In a wrapping machine, an elevator having uniformly spaced article supporting platens that trail one another in an endless path, means for driving said elevator intermittently in one direction with dwells at intervals such that two successive platens are positioned one at an article receiving station and the other at an article discharging station during each dwell, means operable during each of said dwells for simultaneously moving an article onto the platen at said receiving station and an article off the platen at said discharging station, means for clamping the leading end of a wrapper web to an article and to the platen onto which it is moved at said receiving station, means for guiding the web in a substantially vertical path adjacent the path of travel of the platens between said stations, a cutter blade movably mounted on the elevator below each platen, and means controlled by movements of said elevator for imparting web severing strokes to said blades.

6. In a wrapping machine, an elevator having uniformly spaced article supporting platens that trail one another in an endless path, means for driving said elevator in one direction with advancing movements alternating with dwells in which superposed platens are positioned one at an article receiving station and the other at an article discharging station above the receiving station, means operable during each dwell for simultaneously moving an article onto the platen at said article receiving station and moving an article off the platen at said article discharging station, means for draping the leading end of a wrapper web in the path of each article moving onto the platen at the receiving station, means for clamping said web to said article and to the platen upon which it is supported, and means for severing the web below the platen to which it is clamped during the travel thereof from the receiving station to the discharging station.

7. In a wrapping machine, an elevator having uniformly spaced article supporting platens that trail one another in an endless path, means for driving said elevator in one direction with advancing movements alternating with dwells in which superposed platens are positioned one at an article receiving station and the other at an article discharging station above the receiving station, means operable during each dwell for simultaneously moving an article onto the platen at said article receiving station and moving an article off the platen at said article discharging station, means for draping the leading end of a wrapper web in the path of each article at the receiving station, means for clamping said web to said article and to the platen upon which it is supported, a movable cutter carried by the elevator below each platen and means controlled by movements of the elevator for actuating said cutters successively to sever the wrapper web.

8. In a wrapping machine, an elevator having uniformly spaced article supporting platens that trail one another in an endless path, means for driving said elevator in one direction with advancing movements alternating with dwells in which superposed platens are positioned one at an article receiving station and the other at an article discharging station above the receiving station, means operable during each dwell for simultaneously moving an article onto the platen at said article receiving station and moving an article off the platen at said article discharging station, means for draping the leading end of a wrapper web in the path of each article at the receiving station, means for clamping said web to said article and to the platen upon which it is supported, a movable cutter carried by the elevator below each platen, and means including a cam mounted in a fixed position alongside the elevator between said stations to actuate the cutter below the platen to which said web is clamped to sever the same.

9. In a wrapping machine, an elevator having uniformly spaced article supporting platens that trail one another in an endless path, means for driving said elevator in one direction with advancing movements alternating with dwells in which superposed platens are positioned one at an article receiving station and the other at an article discharging station above the receiving station, means for maintaining each of said platens in horizontal position during its travel from said receiving station to said discharge station, means operable during each dwell for simultaneously moving an article onto the platen at said receiving station and moving an article off the platen at said discharging station, means for draping the leading end of a wrapper web in the path of each article to be moved onto the elevator at the receiving station, means for clamping said web to said article and to the elevator platen upon which the article is supported, a cutter blade movably mounted on the elevator below each platen, means for guiding said web in a substantially vertical path alongside said elevator, and means for imparting a web severing stroke to each cutter during the travel of the platen below which it is mounted from the receiving station to the discharging station.

10. In a wrapping machine, an elevator having uniformly spaced article supporting platens that trail one another in an endless path, means for driving said elevator in one direction with advancing movements alternating with dwells in which superposed platens are positioned one at an article receiving station and the other at an article discharging station above the receiving station, means for maintaining each of said platens in horizontal position during its travel from said receiving station to said discharge station, means operable during each dwell for simultaneously moving an article onto the platen at said receiving station and moving an article off the platen at said discharging station, means for draping the leading end of a wrapper web in the path of each article to be moved onto the elevator at the receiving station, means for clamping said web to said article and to the elevator platen upon which the article is supported, a cutter blade movably mounted on the elevator below each platen, means for guiding said web in a substantially vertical path alongside said elevator, a cam mounted in a fixed position alongside said elevator between said stations, and cutter actuating means for each cutter blade mounted on the elevator and engageable with said cam during travel of said elevator.

11. In a wrapping machine, an elevator having uniformly spaced article supporting platens that trail one another in an endless path, means for driving said elevator in one direction with advancing movements alternating with dwells in which superposed platens are positioned one at an article receiving station and the other at an article discharging station above the receiving station, means for maintaining each of said platens in horizontal position during its travel past said stations, means operable during each dwell for simultaneously moving an article onto the platen at said receiving station and moving an article off the platen at said discharging station, means for draping the leading end of a wrapper web between the elevator platen and an article to be moved onto the platen at the receiving station, means for clamping said web to said article and to the platen on which said article is received, means for guiding said web in a substantially vertical path alongside the elevator during upward movement of the platen to which the web is clamped, a web severing cutter blade mounted on the elevator beneath each platen for horizontal movement, and means for imparting a web severing stroke to said cutter blade while it is traveling upwardly between said stations.

12. In a wrapping machine, an elevator having uniformly spaced article supporting platens that trail one another in an endless path, means for driving said elevator in one direction with advancing movements alternating with dwells in which superposed platens are positioned one at an article receiving station and the other at an article discharging station above the receiving station, means for maintaining each of said platens in horizontal position during its travel past said stations, means operable during each dwell for simultaneously moving an article onto the platen at said receiving station and moving an article off the platen at said discharging station, means for draping the leading end of a wrapper web between the elevator platen and an article to be moved onto the platen at the receiving station, means for clamping said web to said article and to the platen on which said article is received, means for guiding said web in a substantially vertical path alongside the elevator during upward movement of the platen to which the web is clamped, a web severing cutter blade mounted on the elevator beneath each platen for horizontal movement, actuating means for each cutter, and a cam mounted in a fixed position between said stations for controlling operation of said cutter actuating means.

13. In a wrapping machine, an elevator comprising a supporting member mounted to rotate about a horizontal axis, a series of regularly spaced platens carried by said member and means for holding said platens horizontal during their travel, means for intermittently driving said supporting member in one direction with advancing movements through an angle corresponding to the spacing of said platens alternating with dwells during which two successive platens at one side of said horizontal axis are positioned at a receiving station and at a discharging station, respectively, means operable during each dwell for simultaneously moving an article toward said axis and onto the platen at the receiving station and an article off the platen in the opposite direction at the discharging station, means for clamping the leading end of a wrapper web to an article and to the platen onto which the article is moved at the receiving station, and means for severing the web below the platen to which it is clamped during the travel of said platen from the receiving station to the discharging station.

14. In a wrapping machine, an elevator comprising a supporting member mounted to rotate about a horizontal axis, a series of platens carried by said member and regularly spaced about said axis and means for holding said platens horizontal during their travel, means for intermittently driving said supporting member in one direction with advancing movements through an angle corresponding to the spacing of said platens alternating with dwells during which two successive platens are positioned at the same side of said axis and at substantially equal distances above and below said axis, means for supporting a wrapper web with its leading end adjacent the lower of said two platens, means operable during each dwell for moving an article to be wrapped toward said axis into engagement with the leading end of said web and onto a platen and for clamping said leading end of the web to the article and to the platen supporting the same, means for moving each platen toward said axis during its upward movement from its article receiving position to cause the platen to travel in substantially a straight line vertically, means for holding said web in substantially vertical position below the platen to which it is clamped, a cutter carried by said elevator below each platen, means for actuating one of said cutters to sever said web below the platen to which it is clamped during each movement of the elevator, and means for discharging an article from the upper of said two platens simultaneously with the movement of an article onto the platen beneath it.

15. In a wrapping machine, an elevator having uniformly spaced article supporting platens that trail one another in an endless path, means for driving said elevator intermittently in one direction with dwells at intervals such that two successive platens are positioned during each dwell, one at an article receiving station and the other at an article discharging station above the receiving station, means including a horizontal supporting member adjacent said elevator and above said article receiving station for suporting a wrapper web with its leading end suspended from said member and extending below the platen at said receiving station, means operable during each dwell for moving an article into engagement with the draped end of said web and onto the platen at said receiving station, means for clamping the leading end of said web to said article and to the platen on which the article is supported, a stripper engageable with the upper face of said web between said supporting member and said elevator, means for moving said stripper downwardly during movement of the elevator to draw out a sufficient length of wrapper web to provide a drape for another article to be wrapped, web severing means, means for actuating said severing means during movement of the elevator to sever the web below the platen to which it is clamped, and means operable during each dwell of the elevator for discharging an article enevloped by its wrapper from the platen at said discharging station.

16. In a wrapping machine, an elevator having uniformly spaced article supporting platens that trail one another in an endless path, means for driving said elevator intermittently in one direction with dwells at intervals such that two successive platens are positioned during each dwell, one at an article receiving station and the other at an article discharging station above the receiving station, means including a horizontal supporting member adjacent said elevator and above said article receiving station for supporting a wrapper web with its leading end suspended from said member and extending below the platen at said receiving station, means operable during each dwell for moving an article into engagement with the draped end of said web and onto the platen at said receiving station, means for clamping the leading end of said web to said article and to the platen on which the article is supported, a stripper engageable with the upper face of said web between said supporting member and said elevator, means for moving said stripper downwardly to draw out a sufficient length of wrapper web to provide a drape for another article to be wrapped, web severing means, means for actuating said severing means to sever the web below the platen to which it is clamped, means for changing the timing of the operation of the web severing means with respect to the operation of said stripper to vary the length of the drape, and means operable during each dwell of the elevator for discharging an article enveloped by its wrapper from the platen at said discharge station.

17. In a wrapping machine having an elevator provided with an article receiving platen, means for intermittently actuating said elevator with successive dwells during the first of which said platen is positioned at an article receiving station and during the second of which said platen is positioned at a discharging station above said article receiving station, means for supporting a web of wrapping material including a horizontal supporting member adjacent said elevator and above said article receiving station over which the leading end of the wrapper web is draped, means at the article receiving station for moving an article to be wrapped into engagement with the draped end of said web and onto the platen, means for clamping the leading end of the wrapper web to the article and to the platen upon which the article is supported, a stripper engageable with the top face of the wrapper web between said supporting member and elevator to draw a sufficient length of web over said supporting member to form a drape for the next article to be wrapped, means for actuating said stripper during movement of said platen from said receiving station to said discharging station, web severing means engageable with the web between said stations, means for actuating said severing means during the movement of said platen from the receiving station to said discharging station, and means for discharging the article with its enveloping wrapper from said platen at said discharging station.

18. In a wrapping machine having an elevator provided with an article receiving platen, means for intermittently actuating said elevator with successive dwells during the first of which said platen is positioned at an article receiving station and during the second of which said platen is positioned at a discharging station above said article receiving station, means for supporting a web of wrapping material including a horizontal supporting member adjacent said elevator and above said article receiving station over which the leading end of the wrapper web is draped, means at the article receiving station for moving an article to be wrapped into engagement with the draped end of said web and onto the platen, means for clamping the leading end of the wrapper web to the article and to the platen upon which the article is supported, a stripper engageable with the top face of the wrapper web between said supporting member and elevator to draw a sufficient length of web over said supporting member to form a drape for the next article to be wrapped, means for actuating said stripper during movement of said platen from said receiving station to said discharging station, web severing means engageable with the web between said stations, means for actuating said web severing means during downward movement of said stripper, means for varying the relative timing of the stripper and web severing means to vary the length of the drape, and means for discharging the article with its enveloping wrapper at said discharging station.

19. In a wrapping machine having an elevator provided with an article receiving platen, means for intermittently actuating said elevator with successive dwells, first with said platen at an article receiving station and next with said platen at an article discharging station above said receiving station, means for supporting a web of wrapping material including a horizontal supporting member adjacent said elevator and above said receiving station over which the leading end of the wrapper web is draped, means at said receiving station for moving an article to be wrapped into engagement with the draped end of said web and onto the platen, means for clamping the leading end of the wrapper web to the article on the platen, a stripper engageable with the top face of the web between said supporting member and the elevator to draw a sufficient length of web over said supporting member to provide a drape for the next article to be wrapped, means for actuating said stripper during movement of said platen from said receiving station to said discharging station, a web severing blade carried by said elevator beneath said platen and engageable with the web between said stations, means for actuating said blade to sever said web during the downward movement of said stripper, means for varying the relative timing of the operations of said stripper and said blade to vary the length of the drape, and means for adjusting said blade vertically with respect to the platen to vary the width of the final underlap.

20. In a wrapping machine, an elevator having an article supporting platen, means for intermittently actuating said elevator with successive dwells in the first of which said platen is in an article receiving position and in the second of which said platen is in a discharging position above said receiving position, means for supporting a wrapper web with its leading end adjacent said platen when it is in said receiving position, means operable during said first dwell for engaging an article with the leading end of said web, moving the article onto the platen and clamping the leading end of said web to said article and to said platen, means for guiding said web vertically alongside the elevator during upward movement of said platen to cause the web to wind about the article, means for severing said web at a point spaced a predetermined distance below said platen during upward movement of said elevator, and means for discharging said article and its enveloping wrapper from said platen during said second dwell.

21. In a wrapping machine, an elevator having an article supporting platen, means for intermittently actuating said elevator with successive dwells in the first of which said platen is in an article receiving position and in the second of which said platen is in a discharging position above said receiving position, means for supporting a wrapper web with its leading end adjacent said platen when it is in said receiving position, means operable during said first dwell for engaging an article with the leading end of said web, moving the article onto the platen and clamping the leading end of said web to said article and to said platen, means for guiding said web vertically alongside the elevator during upward movement of said platen to cause the web to wind about the article, a cutter mounted on the elevator beneath said platen, means for moving said cutter into engagement with the web during upward movement of said platen, and means for discharging said article and its enveloping wrapper from said platen during said second dwell.

22. In a wrapping machine, an elevator having an article supporting platen, means for intermittently actuating said elevator with successive dwells in the first of which said platen is in an article receiving position and in the second of which said platen is in a discharging position above said receiving position, means for supporting a wrapper web with its leading end adjacent said platen when it is in said receiving position, means operable during said first dwell for engaging an article with the leading end of said web, moving the article onto the platen and clamping the leading end of said web to said article and to said platen, means for guiding said web vertically alongside the elevator during upward movement of said platen to cause the web to wind about the article, a cutter blade movably mounted on said elevator beneath said platen and extending transversely of said web, said blade having a scalloped edge for engagement with said web, means for imparting a slicing stroke to said blade during which it moves toward the web into engagement therewith and transversely of the web to slice the same, and means for discharging the article with its enveloping wrapper during said second dwell.

23. In a wrapping machine, an elevator having spaced article supporting platens that trail one another in an endless path, a pair of spaced supports slidably mounted on each platen, a tucker arm movably mounted on each support, means for moving said arms on said supports to spread the same to receive an article between them and oppositely into gripping engagement with an article on the platen, screws engaging each of said supports, and means for simultaneously actuating all of said screws to simultaneously adjust said supports.

24. In a wrapping machine, an elevator having spaced article supporting platens that trail one another in an endless path, a pair of spaced tucker supports slidably mounted on each platen, a shaft on each platen having oppositely threaded portions in engagement with said supports to adjust the same toward or away from one another, a driving connection between said shafts for simultaneously turning said shafts equally to simultaneously and equally adjust the supports on each platen.

25. In a wrapping machine, an elevator having spaced article supporting platens that trail one another in an endless path, means for driving said elevator intermittently in one direction with a dwell in which one platen is positioned at an article receiving station and another at an article discharging station above said receiving station, means at said receiving station for pushing an article onto a platen, a paper gripping follower of less height than the article to be wrapped slidably mounted on each platen and against which an article is pushed at said receiving station, an article discharging pusher at said discharging station movable across an article supporting platen and engageable with said follower to move the same toward an edge of said platen, and means for lifting said pusher clear of said follower and engaging the pusher directly with the article during the movement of the pusher across the platen.

26. In a wrapping machine, an elevator having spaced article supporting platens that trail one another in an endless path, means for driving said elevator intermittently in one direction with a dwell in which one platen is positioned at an article receiving station and another at an article discharging station above said receiving station, means at said receiving station for pushing an article onto a platen, a paper gripping follower of less height than the article to be wrapped slidably mounted on each platen and against which an article is pushed at said receiving station, an article discharging pusher at said discharging station movable across an article supporting platen and engageable with said follower to move the same toward an edge of said platen, means for lifting said pusher clear of said follower and engaging the pusher directly with the article during the movement of the pusher across the platen, and a continuously driven endless conveyor receiving articles discharged by said pusher.

27. In a wrapping machine, an elevator having spaced article supporting platens that trail one another in an endless path, means for driving said elevator intermittently in one direction with a dwell in which one platen is positioned at an article receiving station and another at an article discharging station above said receiving station, means at said receiving station for pushing an article onto a platen, a paper gripping follower of less height than the article to be wrapped slidably mounted on each platen and against which an article is pushed at said receiving station, a discharge runway at said article discharging station, an endless conveyor above said discharge station that is driven continuously at a uniform speed and that has spaced depending pusher arms so spaced that one sweeps across a platen at the discharge station during each dwell of the elevator to discharge an article from the platen onto said runway, and a second endless conveyor continuously driven at a slower speed positioned to receive articles discharged from the elevator by said pusher arms, said second conveyor having its upper run above said runway and having flights that extend across the runway and that are spaced apart a distance less than said pusher arms.

28. In a wrapping machine, an elevator having an article receiving platen provided with a pair of movable tuckers spaced apart for engagement with opposite ends of an article being wrapped, a transverse endless feed conveyor having articulated plates that form a flat article supporting run in front of said elevator, said feed conveyor having regularly spaced pairs of article positioning members that project upwardly from said plates on the article supporting run, means for driving said elevator intermittently with dwells in which said platen is alined with the article supporting run of said conveyor, means for intermittently driving said conveyor with advancing movements through a distance equal to the spacing of said pairs of positioning members and with dwells in which an article held by a pair of positioning members is alined with the space between said tuckers, means timed with respect of the movements of the elevator and conveyor for transferring articles from the conveyor to the elevator, and means for adjusting the positioning members of each pair equally in opposite directions toward or away from a point midway between them and for simultaneously imparting the same adjustment to every pair of positioning members on the conveyor to accommodate the conveyor to articles of different lengths without changing the spacing of said pairs of positioning members and without causing mislinement of articles on the conveyor with respect to the tuckers on the elevator.

29. In a wrapping machine, an elevator having an article receiving platen provided with a pair of movable tuckers spaced apart for engagement with opposite ends of an article being wrapped, a transverse feed conveyor extending across the front of said elevator, said conveyor comprising two endless bands disposed side by side and each composed of articulated plates, the plates of the two bands lying side by side and in the same plane during a portion of their travel to form a flat article carrying run across the front of said elevator, regularly spaced pairs of article positioning plates on said conveyor, said positioning plates being disposed transversely of the path of travel of the conveyor and extending upwardly from said articulated plates during their travel in the article carrying run, one member of each pair of positioning members being attached to a plate of one band and the other member of each pair being attached to a plate of the other band, a driving shaft having wheels attached thereto over which said bands run and which have driving engagement with said bands, means for adjusting said wheels simultaneously on said shaft through equal and opposite angles on said shaft to simultaneously and equally adjust the distances between the positioning plates of each pair without changing the spacing of said pairs, means for intermittently driving said elevator with dwells in which said platen is alined with said article supporting run, means for intermittently driving said conveyor advancing movements through a distance corresponding to the spacing of said pairs of positioning members and with dwells in which articles held by said positioning members are alined with tuckers on said elevator, and means timed with respect to movements of said elevator and said conveyor for transferring articles from said conveyor to said elevator.

30. A feed conveyor for wrapping machines comprising two endless bands disposed side by side and each composed of closely spaced flat articulated plates, the plates of the two bands lying side by side and each composed of articulated plates so connected that the plates of both bands lie in the same plane during a portion of their travel to form a flat article carrying run, regularly spaced pairs of article positioning plates carried by said bands, said positioning plates extending transversely to their line of travel and projecting upwardly from the articulated plates during their travel in the article carrying run, the spacing of the plates of all pairs being the same and the pairs of plates being equally spaced throughout said bands, one positioning plate of each pair being attached to one band and the other plate of each pair being attached to the other band, a driving shaft having two wheels attached thereto over which said bands run and which have driving engagement with said bands, and means for adjusting said wheels on said shaft simultaneously through equal and opposite angles to simultaneously and equally adjust the distance between the positioning plates of each pair without changing the spacing of said pairs.

31. In a wrapping machine of the type in which the article being wrapped measures the length of the wrapper applied thereto, in which the leading end of a web of wrapping material is drawn into the wrapping mechanism and in which the wrapper for the article being wrapped is severed from the web during the wrapping operation, the improvement which comprises means operable to feed said web from a suitable source toward said wrapping mechanism, web guiding means providing a slack loop between said web feeding means and said wrapping mechanism, means preventing reverse movement of said web from said wrapping mechanism toward said slack loop, means controlled by lengthening and shortening movements of said slack loop independently of said wrapping mechanism for operating said feeding means to maintain at all times a length of web in said slack loop more than sufficient to wrap an article, and means for maintaining a slight tension at all times on the web in said loop.

32. In a wrapping machine of the type in which the article being wrapped measures the length of the wrapper applied thereto, in which the leading end of a web of wrapping material is drawn into the wrapping mechanism and in which the wrapper for the article being wrapped is severed from the web during the wrapping operation, the improvement which comprises means operable to feed said web from a suitable source toward said wrapping mechanism, web guiding means providing a slack loop between said web feeding means and said wrapping mechanism, means preventing reverse movement of said web from said wrapping mechanism toward said slack loop, a control for said feeding means operated by shortening and lengthening movements of said slack loop to cause said feeding means to feed said web into said slack loop whenever the slack loop is reduced to a predetermined length and to discontinue the operation of said feeding means upon a predetermined increase in the length of said slack loop, and means for maintaining a slight tension at all times on the web in said loop.

33. In a wrapping machine of the type in which the article being wrapped measures the length of wrapper applied thereto, in which the leading end of a web of wrapping material is drawn into the wrapping mechanism and in which the wrapper for the article being wrapped is severed from the web during the wrapping operation, the improvement which comprises means for rotatably supporting a roll of wrapping material, web guiding means providing a slack loop between said roll and said wrapping mechanism, means for preventing reverse movement of the web from the wrapping mechanism toward said loop, roll driving means controlled by shortening and lengthening of said slack loop for maintaining at all times in said slack loop a length of web more than sufficient to wrap an article, and means for maintaining a slight tension at all times on the web in said loop.

34. In a wrapping machine of the type in which the article being wrapped measures the length of wrapper applied thereto, in which the leading end of a web of wrapping material is drawn into the wrapping mechanism and in which the wrapper for the article being wrapped is severed from the web during the wrapping operation, the improvement which comprises means for rotatably supporting a roll of wrapping material, web guiding means providing a slack loop between said roll and said wrapping mechanism, means for preventing reverse movement of the web from the wrapping mechanism toward said loop, a drive shaft, a driving connection including a clutch between said shaft and said roll, means for automatically engaging said clutch to drive said roll in a direction to feed said web into said loop when the length of web in said loop is reduced to a predetermined amount, means for automatically disengaging said clutch upon a predetermined increase over said predetermined amount in the length of web in said loop, and means for maintaining a slight tension at all times on the web in said loop.

35. In a wrapping machine of the type in which the article being wrapped measures the length of wrapper applied thereto and in which the wrapping mechanism has means for clamping the leading end of a web of wrapping material to an article, winding the web about the article and severing the wrapper enveloping the article from said web, the improvement which comprises means for rotatably supporting a roll of wrapping material, web guiding means providing a slack loop between said roll and said wrapping mechanism, means between said slack loop and said wrapping mechanism for preventing reverse movement of said web toward said loop, a drive shaft, means for automatically establishing a driving connection between said shaft and said roll to drive the roll in a direction to feed said web into said loop when the portion of the web forming the slack loop is reduced to a predetermined length, means for automatically disconnecting the driving connection between said roll from said shaft when the length of the slack loop has increased a predetermined amount, and means for maintaining a slight tension at all times on the web in said loop.

36. In a wrapping machine of the type in which the article being wrapped measures the length of the wrapper applied thereto, in which the leading end of a web of wrapping material is drawn into the wrapping mechanism and in which the wrapper for the article being wrapped is severed from the web during the wrapping operation, the improvement which comprises means rotatably supporting a roll of wrapping material, web guiding means providing a slack loop between said roll and said wrapping mechanism, means including a movable slack roller in said loop for maintaining a slight tension on said web tending to lengthen said loop, means between said slack roller and said wrapping mechanism for preventing reverse movement of said web from the wrapping mechanism toward said roller, driving means, a clutch for connecting said roll to and disconnecting said roll from said driving means, means operated by said slack roller when the slack loop is shortened to a predetermined length to engage said clutch to drive said roll to feed said web from said roll toward said slack loop, and means operated by said slack roller upon a predetermined increase in the length of the loop to disengage said clutch.

37. In a wrapping machine of the type in which the article being wrapped measures the length of the wrapper applied thereto, in which the leading end of a web of wrapping material is drawn into the wrapping mechanism and in which the wrapper for the article being wrapped is severed from the web during the wrapping operation, the improvement which comprises means rotatably supporting a roll of wrapping material, web guiding means providing a slack loop between said roll and said wrapping mechanism, means including a movable slack roller in said loop for maintaining a slight tension on said web tending to lengthen said loop, means between said slack roller and said wrapping mechanism for preventing reverse movement of said web from the wrapping mechanism toward said roller, driving means, a clutch for connecting said roll to and disconnecting said roll from said driving means, clutch controlling means comprising two movable trip members spaced apart longitudinally of said loop for engagement with said roller, means connecting one of said trip members to said clutch to engage the clutch when said slack loop is shortened to a predetermined length, and means connecting the other trip member to said clutch to disengage the clutch upon a predetermined increase in the length of said loop.

38. In a wrapping machine of the type in which the article being wrapped measures the length of the wrapper applied thereto, in which the leading end of a web of wrapping material is drawn into the wrapping mechanism and in which the wrapper for the article being wrapped is severed from the web during the wrapping operation, the improvement which comprises a pair of parallel horizontal rollers providing a support for a roll of wrapping material, means for guiding a web of wrapping material from said roll to said wrapping mechanism, said guiding means including members arranged to dispose a portion of the web in a slack loop, means between the slack loop and said wrapping mechanism for preventing reverse movement of the web from the wrapping mechanism toward said slack loop, means controlled by shortening and lengthening movements of said slack loop for intermittently driving said supporting rollers in a direction to advance the web from the roll to the slack loop to maintain a length of web in the loop in excess of that required to wrap an article, and means for maintaining a slight tension at all times on the web in said loop.

39. In a wrapping machine of the type in which the article being wrapped measures the length of the wrapper applied thereto, in which the leading end of a web of wrapping material is drawn into the wrapping mechanism and in which the wrapper for the article being wrapped is severed from the web during the wrapping operation, the improvement which comprises a pair of parallel horizontal rollers providing a support for a roll of wrapping material, means for guiding a web of wrapping material from said roll to said wrapping mechanism, said guiding means including members arranged to dispose a portion of the web in a slack loop, means between the slack loop and said wrapping mechanism for preventing reverse movement of the web from the wrapping mechanism toward said slack loop, a continuously driven drive shaft, a driving connection from said shaft to said supporting rollers including a clutch, means controlled by said slack loop for engaging said clutch when the web in the loop is reduced to a predetermined length and to disengage said clutch upon a predetermined increase in the length of web in said loop, and means for maintaining at all times a slight tension on the web in said loop.

40. In a wrapping machine of the type in which an article is wrapped in the leading end of a web of wrapping material and measures the length of its wrapper that is severed from the web, the improvement which comprises means rotatably supporting a roll of wrapping material, web guiding means providing a slack loop between said roll and said wrapping mechanism, means including a movable member acting on said loop for maintaining a slight tension on said web tending to lengthen the loop, means between said wrapping mechanism and said slack loop for preventing reverse movement of the web from said wrapping mechanism to said slack loop, two spaced trip members for engagement with said movable member, means for driving said roll in a direction to feed the web to said slack loop to lengthen the same, means operated by one of said trip members for connecting said driving means to said roll, means operated by the other of said trip members for disconnecting said driving means from said roll, and means acting upon said trip members for moving the trip member engaged by said movable member to a position out of the path of said movable member when engaged by said movable member and for simultaneously moving the other trip member into the path of said movable member whereby said slack loop may move past the position it occupies when either of said trips is actuated and said trips are successively operable.

41. In a wrapping machine of the type in which an article is wrapped in the leading end of a web of wrapping material and measures the length of its wrapper that is severed from the web, the improvement which comprises a web feeding mechanism, means for driving said mechanism in a direction to advance the web toward the wrapping mechanism, web guiding means that provides a slack loop between the feeding and wrapping mechanism, means including a movable member acting on said loop to maintain a slight tension on said web tending to lengthen said loop, means between said wrapping mechanism and said slack loop for preventing reverse movement of the web from the wrapping mechanism to said slack loop, two spaced trip members for engagement with said movable member, means operated by one of said trip members upon a predetermined shortening of the slack loop for connecting said driving means to said web feeding mechanism, means operated by the other of said trip members upon a predetermined lengthening of the loop for disconnecting said driving means from said web feeding mechanism, and means acting on said trip members for moving the trip member engaged by said movable member to a position out of the path of said movable member and for simultaneously moving the other trip member into the path of said movable member, whereby the length of the loop may be decreased after actuation of said one of said trip members or increased after actuation of the other of said trip members.

References Cited in the file of this patent
UNITED STATES PATENTS

| | | |
|---|---|---|
| 1,103,500 | Fudge | July 14, 1914 |
| 1,110,090 | Watson | Sept. 8, 1914 |
| 1,117,260 | Sevigne | Nov. 17, 1914 |
| 1,182,393 | Luttrop | May 9, 1916 |
| 1,843,453 | Littlefield | Feb. 2, 1932 |
| 2,037,631 | Hultin | Apr. 14, 1936 |
| 2,088,157 | Petskeyes | July 27, 1937 |
| 2,356,644 | Arelt | Aug. 22, 1944 |
| 2,397,190 | Malhiot | Mar. 26, 1946 |
| 2,400,682 | Bronander | May 21, 1946 |
| 2,600,833 | Beutel | June 17, 1952 |
| 2,676,445 | Kottmann | Apr. 27, 1954 |